United States Patent [19]
Kim

[11] Patent Number: 5,949,488
[45] Date of Patent: Sep. 7, 1999

[54] VIDEO SIGNAL ENCODING SYSTEM CONTROLLER

[75] Inventor: Sung-Jung Kim, Seoul, Rep. of Korea

[73] Assignee: Daewoo Electronics Co., Ltd., Seoul, Rep. of Korea

[21] Appl. No.: 08/774,832

[22] Filed: Dec. 27, 1996

[30] Foreign Application Priority Data

Dec. 28, 1995 [KR] Rep. of Korea .................. 95-61378

[51] Int. Cl.⁶ .............................. H04N 7/12; G06K 9/36
[52] U.S. Cl. ..................... 348/405; 348/407; 348/419; 382/234; 382/236
[58] Field of Search .................. 348/405, 407, 348/410, 417, 419, 420, 422, 423; 382/236, 234, 232; 395/800; H04N 7/12

[56] References Cited

U.S. PATENT DOCUMENTS

| | | | |
|---|---|---|---|
| 5,307,163 | 4/1994 | Hatano et al. | 348/415 |
| 5,333,012 | 7/1994 | Singal et al. | 348/405 |
| 5,421,023 | 5/1995 | Murakami | 395/800 |
| 5,426,463 | 6/1995 | Reiniger et al. | 348/405 |
| 5,739,863 | 4/1998 | Ohtsuki | 348/405 |
| 5,745,179 | 4/1998 | Senda | 348/405 |
| 5,751,358 | 5/1998 | Suzuki et al. | 348/405 |
| 5,751,359 | 5/1998 | Suzuki et al. | 348/405 |

*Primary Examiner*—Tommy P. Chin
*Assistant Examiner*—Tung Vo
*Attorney, Agent, or Firm*—Pennie & Edmonds LLP

[57] ABSTRACT

A controller, for use in a video signal encoding system, decides an inter/intra mode, a field/frame DCT mode and a quantization parameter, wherein the video signal contains a multiplicity of GOP's, each of the GOP's being classified into three types of frames, each of the frames being divided into a multiplicity of macroblocks. The controller comprises: a state machine for generating a control sequence in response to a signal denoting a start of the frame and the type of a frame currently encoded; a calculation unit for providing a first set of values; a processing unit for providing a set of control values for each of the macroblocks in response to the control sequence and the first set of values, the set of control values denoting the inter/intra mode, the field/frame DCT mode and the quantization parameter, based on a macroblock number currently encoded and initial constant values; and a memory and input/output unit for storing the initial constant values and providing them to the processing units, storing the set of control values and providing them to be used in encoding the video signal.

20 Claims, 12 Drawing Sheets

VIDEO SIGNAL ENCODING SYSTEM CONTROLLER

FIELD OF THE INVENTION

The present invention relates to a controller for use in a video signal encoding system; and, more particularly, to a controller which controls the amount of data flowing from the encoding system by adaptively determining a quantization parameter, thereby preventing a buffer from overflowing or underflowing, and which also decides an inter/intra and a field/frame DCT (Discrete Cosine Transform) modes of the encoding system.

DESCRIPTION OF THE PRIOR ART

With recent advances in communication and integrated circuit technologies, transmission of digitized video signals has become a common reality. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data therethrough, it is inevitable to employ compression techniques which reduce the volume of the transmission data without much losing the quality of images. In this regard, several international standards for the compression of digital video signals have emerged over the past decades, with still more under current development. One of them is ISO/IEC MPEG standard which has been developed by the Moving Picture Expert Group(MPEG), part of a joint technical committee of the International Standard Organization (ISO) and the International Electrotechnical Commission (IEC). The standard prescribes the syntax of a compressed bit stream and the method of decoding, but leaves considerable latitude to allow variations in the algorithm employed in an encoding system. As the present invention is intended for use in such an encoding system, in order to facilitate an understanding of the invention, some of the pertinent aspects of the MPEG video compression algorithm will be explained. However, it is to be understood that the invention can also be applied to other video coding algorithms which share some of the features of the MPEG algorithm that are directly related to the present invention.

An MPEG video sequence may be divided into sets of consecutive pictures or frames, each set known as a Group of Pictures(GOP). Each GOP includes a plurality of pictures or frames, each of which is in turn subdivided into slices. Further, each slice consists of a number of macroblocks (MB's), while each MB is made of four 8×8 luminance blocks and two 8×8 chrominance blocks.

Within a GOP, three types of pictures may appear. A first type of pictures, i.e., Intra-mode pictures or I-pictures, are compressed independently of any other pictures. The other two types of pictures are predictively motion compensated pictures (P-pictures) and bidirectionally motion-compensated pictures (B-pictures).

A motion compensation is a compression method to remove redundancies residing between consecutive pictures. In MPEG, each MB is compared with 16×16 regions in a same general spatial location in a reference frame. Frames which are predictively motion compensated using a single preceding frame in the past as the reference frame are P-pictures. This kind of prediction is referred to as a forward-in-time prediction. In B-pictures, backward-in-time prediction is used in addition to the forward-in-time prediction. In I-pictures, all macroblocks are encoded in an intra-mode, i.e., coded by itself without considering the motion compensation. In P-pictures and B-pictures, each macroblock can be coded either in the intra-mode or in an inter-mode wherein the macroblock is coded using motion compensation. To choose one of the two coding modes for a processing macroblock, i.e., a macroblock which is currently processed, VAR_DIF and VAR_ORG are first computed as follows:

$$VAR\_DIF = \frac{\sum_{i=0}^{15}\sum_{j=0}^{15}[O(i,j)-S(i,j)]^2}{256} \quad \text{Eq. (1 A)}$$

$$VAR\_ORG = \frac{\sum_{i=0}^{15}\sum_{j=0}^{15}\{O(i,j)^2 - ave[O(i,j)]\}}{256} \quad \text{Eq. (1 B)}$$

wherein $O(i,j)$ and $S(i,j)$ denote pixel values in an original processing macroblock to be coded and pixel values in a macroblock reconstructed by using a conventional motion compensation method, respectively; i and j being indices denoting a position of a pixel in a macroblock; and $ave[O(i,j)]$ is an average value of $O(i, j)$ in the processing macroblock. VAR_DIF and VAR_ORG are related to the amount of data obtained in encoding the macroblock by using the inter and the intra modes, respectively. As shown in FIG. 10, the inter/intra mode is decided according to the values of VAR_DIF and VAR_ORG.

In the MPEG and several other compression standards, the discrete cosine transform (DCT) is employed. Two types of DCT, i.e., a field-based and a frame-based DCT, can be used selectively in the MPEG encoding procedure which uses an interlaced scanning to define a frame. Horizontal lines which form a frame are divided into an odd and an even fields, wherein even lines(lines 2,4,6 . . . ) form the even field and odd lines (lines 1,3,5, . . . ) form the odd field. A digitized interlaced video signal can be compressed by either "field mode" or "frame mode". In the field mode, each frame is separated into its even and odd fields which are processed independently. In the frame mode, the two fields are processed as a single frame by interleaving the lines of corresponding even and odd fields. Neither option is entirely satisfactory for video compression. Since each frame has twice the number of lines that exist in a field for a given image, there will be more correlations among samples and hence, compressibility will be increased. However, in detailed moving areas, the frame mode processing suffers from spurious high vertical frequencies introduced by interleaving the even and the odd fields.

In regard to DCT, the field/frame DCT mode is selected on a macroblock basis. One of the criteria for deciding the mode of DCT is explained using the following equations(see Test Model 4, ISO-IEC/JTC1/SC29/WG11 MPEG93/225).

$$VAR\_FRM = \sum_{i=0}^{15}\sum_{j=0}^{13}[O(i,j)-O(i,j+1)]^2 \quad \text{Eq. (2 A)}$$

$$VAR\_FLD = \sum_{i=0}^{15}\sum_{j=0}^{13}[O(i,j)-O(i,j+2)]^2 \quad \text{Eq. (2 B)}$$

For macroblocks whose VAR_FRM is larger than VAR_FLD, the frame based DCT is used and for macroblocks whose VAR_FRM is smaller than VAR_FLD, the field based DCT is used.

The DCT coefficients obtained by the field-based or the frame-based DCT are subject to a quantization. The quantization is achieved by dividing a block of DCT coefficients by $W_{mn} \times QP$, with $W_{mn}$ denoting a weight factor matrix and QP being a quantization parameter. The weight factor allows a coarser quantization applied to less visually significant coefficients. The quantization parameter QP functions as a means of trading off an image quality against a bitrate. QP can vary from one MB to another within a frame. Due to this feature, known as an adaptive quantization, different regions of each frame can be quantized with different quantization step sizes.

After the quantization, the quantized coefficients are encoded by using variable length coding (VLC) such as Huffman coding. The amount of data resulting from VLC varies with time depending on the video signal characteristics. Therefore, a rate control scheme is needed to adjust the encoded data to a given transmission rate. As described above, such a rate controller serves to control the amount of encoded data by varying the quantization parameter QP according, primarily, to, e.g., the buffer fullness and activity of an input image.

One of the schemes for controlling the bitrate by adapting the quantization parameter on a macroblock basis will be described. The whole procedure works in three steps: target bit allocation; rate control; and adaptive quantization. In the first step, the number of bits available to encode a next frame is estimated. In the second step, a reference value of the quantization parameter for each macroblock is decided by means of a virtual buffer. Finally, the reference value of the quantization parameter is adjusted according to the spatial activities in the macroblock to derive the quantization parameter. Each of the steps will now be described in greater detail.

<The First Step: Bit Allocation>

After a frame of a certain type (I,P or B-picture) is encoded, a respective "global complexity measure" ($X_i$, $X_p$ or $X_b$) is updated as follows:

$$X_i = S_i \times Q_i \qquad \text{Eq. (3A)}$$

$$X_p = S_p \times Q_p \qquad \text{Eq. (3B)}$$

$$X_b = S_b \times Q_b \qquad \text{Eq. (3C)}$$

wherein $S_i$, $S_p$ or $S_b$ represents the number of bits generated by encoding the corresponding frame and $Q_i$, $Q_p$ or $Q_b$ is an average quantization parameter computed by averaging the actual quantization parameter values for all the macroblocks in the frame.

At the start of the encoding process, the initial constant values of the complexity measure are determined as:

$$X_i = 160 \times \text{BIT\_RATE}/115 \qquad \text{Eq. (3D)}$$

$$X_p = 60 \times \text{BIT\_RATE}/115 \qquad \text{Eq. (3E)}$$

$$X_b = 42 \times \text{BIT\_RATE}/115 \qquad \text{Eq. (3F)}$$

wherein the value of BIT_RATE is a predetermined constant measured in bits/sec.

After $X_i$, $X_p$ or $X_b$ has been decided, a target bit number, i.e., an estimated number of bits generated in encoding a next frame, is decided in advance.

The target bit number for an I, P or B picture ($T_i$, $T_p$ or $T_b$) is computed as:

$$T_i = \max\left[\frac{R}{1 + \frac{N_p \times X_p}{X_i \times K_p} + \frac{N_b \times X_b}{X_i \times K_b}}, \frac{\text{BIT\_RATE}}{8 \times \text{PICTURE\_RATE}}\right] \qquad \text{Eq. (4A)}$$

$$T_p = \max\left[\frac{R}{N_p + \frac{N_b \times K_p \times X_b}{K_b \times X_p}}, \frac{\text{BIT\_RATE}}{8 \times \text{PICTURE\_RATE}}\right] \qquad \text{Eq. (4B)}$$

$$T_b = \max\left[\frac{R}{N_b + \frac{N_p \times K_b \times X_p}{K_p \times X_b}}, \frac{\text{BIT\_RATE}}{8 \times \text{PICTURE\_RATE}}\right] \qquad \text{Eq. (4C)}$$

wherein $K_p$ and $K_b$ are predetermined constants.

R is the remaining number of bits assigned to the current GOP and updated after encoding a frame as follows:

$$R = R - S_i (\text{or } S_p \text{ or } S_b) \qquad \text{Eq. (5)}$$

wherein $S_i$ (or $S_p$ or $S_b$) is the number of bits generated in the frame just encoded, with the subscript i,p or b denoting the type of the frame. The value of R, before a first frame in a GOP is encoded, is decided as:

$$R = G + R \qquad \text{Eq. (6A)}$$

$$G = \text{BIT\_RATE} \times N / \text{PICTURE\_RATE} \qquad \text{Eq. (6B)}$$

wherein N is a constant denoting the number of frames in the GOP and the value of PICTURE_RATE is a predetermined constant. At the start of the encoding process, the initial constant value of R is 0.

In Eqs. 4A to 4C, $N_p$ and $N_b$ are the numbers of P-pictures and B-pictures remaining in the current GOP. Therefore, at the start of a GOP, $N_p$ and $N_b$ are the total numbers of P-pictures and B-pictures included in the GOP, respectively.

<The Second Step: Rate Control>

At this step, a reference quantization parameter is calculated for each macroblock based on the concept of the virtual buffer.

Before encoding macroblock m, the level of fullness in the virtual buffer is determined depending upon the type of frame as follows:

$$d_m^i = d_0^i + B_{m-1} - \frac{T_i \times (m-1)}{\text{MB\_cnt}} \qquad \text{Eq. (7A)}$$

$$d_m^p = d_0^p + B_{m-1} - \frac{T_p \times (m-1)}{\text{MB\_cnt}} \qquad \text{Eq. (7B)}$$

$$d_m^b = d_0^b + B_{m-1} - \frac{T_b \times (m-1)}{\text{MB\_cnt}} \qquad \text{Eq. (7C)}$$

wherein $d_0^i$, $d_0^p$ and $d_0^b$ represent the level of fullness in the virtual buffers at the start of a picture for the respective picture types; $B_m$ is the number of bits generated by encoding all macroblocks in the current picture up to and including the macroblock m; MB_cnt is the number of macroblocks in the picture; and $d_m^i$, $d_m^p$ and $d_m^b$ are the levels of fullness in virtual buffers at macroblock m, for the respective picture types.

The final fullness of the virtual buffer at the end of the picture (i.e., $d_m^i$, $d_m^P$, $d_m^b$ when m=MB_cnt) is used as $d_0^i$, $d_0^P$ and $d_0^b$ for encoding a next picture of the same type.

Then, the reference quantization parameter ($Q_m$) for the macroblock m is determined as follows:

$$Q_m=(d_m\times 31)/r \quad \text{Eq. (8)}$$

wherein r=2×BIT_RATE/PICTURE_RATE and $d_m$ is the fullness of the virtual buffer.

At the start of the encoding process, the fullness value for the virtual buffer is:

$$d_0^i=10\times r/31 \quad \text{Eq. (7D)}$$

$$d_0^P=K_p d_0^i \quad \text{Eq. (7E)}$$

$$d_0^b=K_b d_0^i \quad \text{Eq. (7F)}$$

<The Third Step: Adaptive Quantization>

At this step, Mquant (modified quantization parameter) actually used in quantizing each macroblock is calculated from the reference quantization parameter based on the spatial activity of the image.

The spatial activity measure for the macroblock m is computed from the four luminance frame-organized blocks and the four field-organized blocks of the macroblock m using the intra pixel values as:

$$\text{act}_m = 1+\min(\text{var\_sblk})\text{sblk}=1 \text{ to } 8 \quad \text{Eq. (9)}$$

wherein $$\text{var\_sblk} = \frac{1}{64}\sum_{n=1}^{64}(P_n - P_{mean})^2 \quad \text{Eq. (10)}$$

and $$P_{mean} = \frac{1}{64}\sum_{n=1}^{64}P_n \quad \text{Eq. (11)}$$

with $P_n$ being pixel values in the original block. In case of the frame-organized blocks, a block consists of 8 successive lines while in case of the field-organized blocks, lines of the odd field and the even field are divided to form separate blocks.

Then, the normalized $\text{act}_m$ (N_$\text{act}_m$) is determined as $$N\_\text{act}_m = \frac{2\times \text{act}_m + \text{avg\_act}}{\text{act}_m + 2\times \text{avg\_act}} \quad \text{Eq. (12)}$$

wherein avg_act is the average value of $\text{act}_m$ for the last picture. On the first frame, avg_act is 400.

Thereafter, Mquant is finally determined as follows:

$$\text{Mquant}_m = Q_M \times N\_\text{act}_m. \quad \text{Eq. (13)}$$

The final value of $\text{Mquant}_m$ is clipped to a range of 1 to 31 and is used in the quantization process.

By doing this, in case the number of bits resulting from the encoding process exceeds a predetermined value (data fed to the buffer increases), a quantization step size is decreased (and vice versa), to thereby render the buffer fullness to a certain level.

The three tasks described above, i.e., the inter/intra and the field/frame DCT mode and the quantization parameter decisions, relate to a series of mathematical processes. Although these jobs can be done by using a general purpose processor, it would be more advantageous and desirable in terms of cost and speed to design a circuit which is dedicated to these tasks.

SUMMARY OF THE INVENTION

It is, therefore, a primary object of the present invention to provide a structure and an operating scheme of a controller dedicated to the task of calculating the quantization parameter, and deciding the inter/intra mode and the field/frame DCT mode.

In accordance with the present invention, there is provided a controller, for use in a video signal encoding system, for deciding an inter/intra mode, a field/frame DCT mode and a quantization parameter, wherein the video signal contains a multiplicity of GOP's, each of the GOP's being classified into three types of frames, with each of the frames being divided into a multiplicity of macroblocks, each macroblock consisting of a plurality of blocks, each block including a half-block having odd-numbered lines and a half-block having even-numbered lines, and the encoding system encodes the video signal on a macroblock basis, said controller comprising:

a state machine for generating a control sequence which includes a plurality of control signals in response to a signal denoting a start and a type of a frame currently encoded;

a calculation unit for providing a first set of values by calculating a first group of predetermined equations;

a processing unit for generating, in response to the control sequence and the first set of values, a set of control values for each of the macroblocks in the picture, the set of control values denoting the inter/intra mode, the field/frame DCT mode and the quantization parameter, by calculating a second group of predetermined equations based on the sequential number of a macroblock currently encoded and predetermined initial constant values; and a memory and input/output unit for storing the initial constant values, providing the initial constant values to the processing unit, storing the set of control values determined at the processing unit and providing the control values to be used in encoding the video signal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
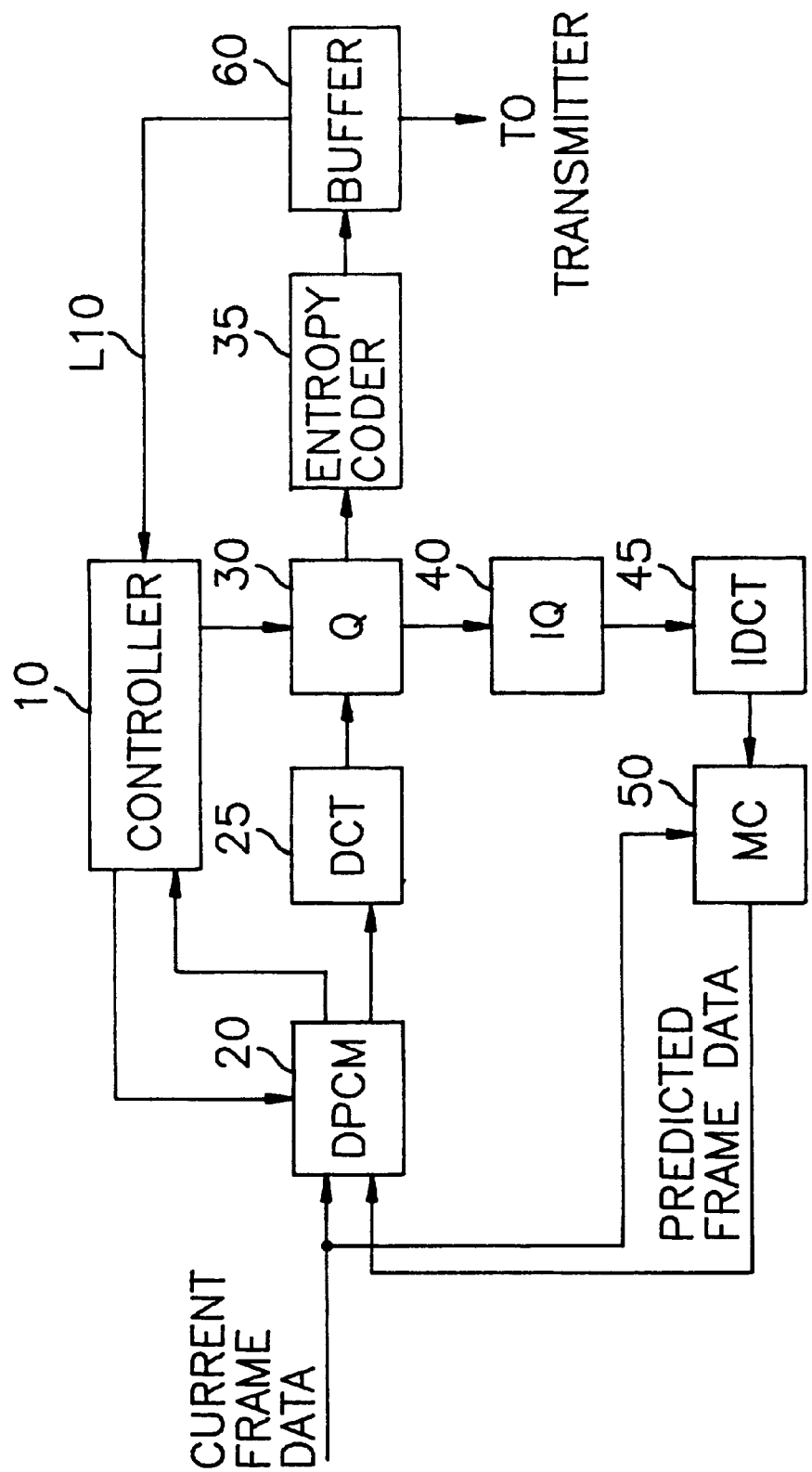
FIG. 1 shows a block diagram of a video signal encoding system which employs a controller of the present invention.

With reference to FIG. 1, there is shown a block diagram of a conventional video encoding system which employs a controller 10 of the present invention, which decides an inter/intra mode, a field/frame DCT mode and a quantization parameter Mquant.

First, current frame data of a video signal to be encoded is fed to a DPCM block 20 and a motion compensation ("MC") block 50. Predicted frame data from the MC block 50 is also fed to the DPCM block 20. Actually, the video data is provided and processed on a macroblock basis throughout the encoding process. At the DPCM block 20, differential frame data which is the difference between the predicted frame data and the current frame data, or the current frame data itself is provided to a DCT block 25 depending upon a coding mode, i.e., inter/intra mode of a relevant macroblock. The difference or the current frame data is transformed by using, e.g., DCT, at the DCT block 25 and transform coefficients are fed to a quantization ("Q") block 30 and quantized therein. Thereafter, the quantized transform coefficients are transmitted via two signal paths: one that leads toward an entropy coder 35, wherein the quantized transform coefficients are coded by using, for example, a combination of run-length and variable length coding; and the other that leads to an inverse quantization ("IQ") block 40 and then to an inverse DCT ("IDCT") block 45, wherein the quantized transform coefficients are converted back into reconstructed frame data. The reconstructed frame data is fed to the MC block 50 wherein the predicted frame data is obtained by using a motion estimation and compensation method which is known in the art. The encoded data from the entropy coder 35 is fed to a buffer 60 and transmitted to a corresponding decoding system.

On the other hand, the controller 10 receives the differential and the current frame data provided from the DPCM block 20 and a signal notifying fullness of the buffer 60 provided therefrom. The controller 10 of the present invention serves to determine the inter/intra mode, the field/frame DCT mode and the quantization parameter on a macroblock basis and provide signals to notify the former two to the DPCM block 20 and the last one to the Q block 30. In response to the inter/intra mode signal, the DPCM block 20 provides the differential frame data and the current frame data (inter mode), or the current frame data itself (intra mode) to the DCT block 25. The difference or the current frame data is provided in a unit of an 8×8 block and 8×8 DCT is performed therefor. Format of such blocks provided from the DPCM block 20 to the DCT block 25 depends on the field/frame DCT mode signal. In case of the frame DCT mode, the DPCM block 20 provides frame-organized blocks while in case of the field DCT mode, it provides field-organized blocks, so that the DCT block 25 can perform the field or the frame based DCT depending on the mode. The quantization parameter provided to the Q block 30 is utilized in adjusting the coarseness/fineness of the quantization and thereby controls the fullness of the buffer 60.

Figure 2:
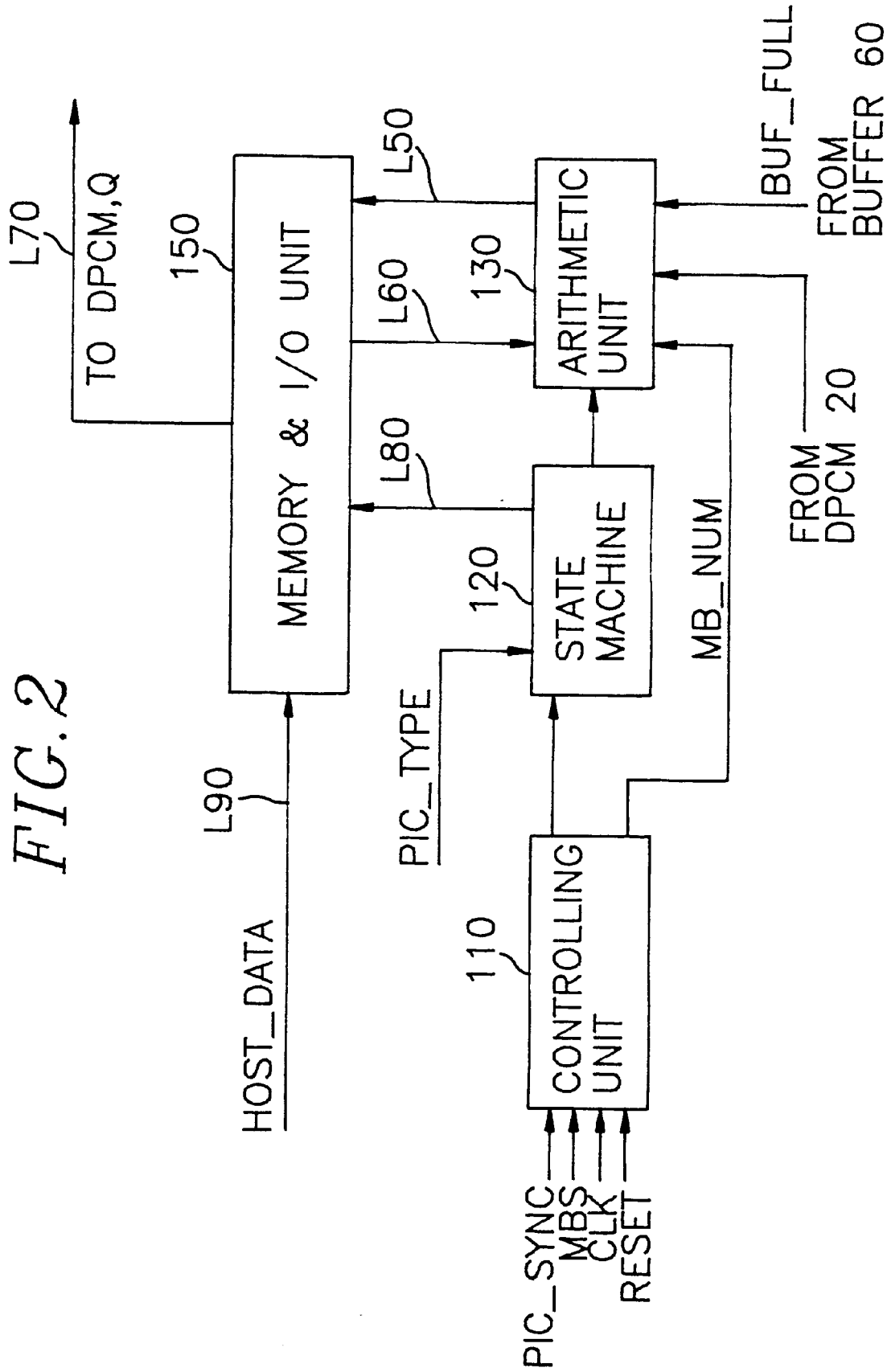
FIG. 2 depicts a structure of the controller of the present invention.

Referring to FIG. 2, there is shown a detailed block diagram of the controller 10 shown in FIG. 1.

At the controller 10 of the present invention, all arithmetic calculations involved in the three types of decisions are performed at an arithmetic unit 130 with the help of a state machine 120 and a memory and I/O unit 150.

Input signals used to accomplish the tasks will be presented. The input signals are PIC_SYNC, MBS, CLK, RESET, PIC_TYPE, BUF_FULL and the differential frame data and the current frame data from the DPCM block shown in FIG. 1, and so on. Of the input signals, PIC_SYNC and MBS which are fed to a controlling unit 110 shown in FIG. 2 represent a start of each frame and each macroblock, respectively. RESET and CLK are system control signals. PIC_TYPE inputted to the state machine 120 denotes which of three picture type, i.e., I, P or B, the currently processed frame belongs to. PIC_SYNC, MBS and PIC_TYPE may be obtained from the input video signal stream. BUF_FULL representing the state of the buffer 60 is inputted to the arithmetic unit 130.

Various initial constant values are necessary in doing the three decisions. Such values are predetermined according to a system design and are inputted to the controller 10 of the present invention, more specifically, to the memory and I/O unit 150 via L90 before the controller 10 performs the calculations. In the above equations, initial constant values of $X_i$, $X_p$, $X_b$, R, $N_b$ and $N_p$ at the start of the encoding process and values of $K_p$ and $K_b$ are some of such examples.

In response to the input signals thereto, the controlling unit 110 generates a couple of control signals and provides them to the state machine 120. First, the controlling unit 110 provides PRCS_PIC_MB denoting whether a picture based operation or a macroblock based operation is to be done at the controller 100, wherein the picture based and the macroblock based operations correspond to the equations given above which are performed per each picture and each macroblock, respectively. It is noted that examples of picture based operation is Eqs. 3A to 3C, 4A to 4C, 5 while those of macroblock based operation is Eqs. 1A, 1B, 2A, 2B, 7A to 7C, 8 to 13. Second, the controlling unit 110 generates MB_NUM which identifies a macroblock which is to be currently processed and provides it to the arithmetic unit 130.

In response to the input signals, e.g., PIC_TYPE and PRCS_PIC_MB, the state machine 120 generates a stream of control sequences and provides it to the arithmetic unit 130 and the memory and I/O unit 150, to thereby make the arithmetic unit 130 performing one of the equations described above. The state machine 120 may be programmed to generate the control sequences which are predetermined depending on which equation is performed at the arithmetic unit 130.

The memory and I/O unit 150 receives and stores the initial constant values from a host processor (not shown) on L90 and calculation results from the arithmetic unit 130 on L50. In response to the control sequence via L80 from the state machine 120, the memory and I/O unit 150 is controlled to provide on L60 the initial constant values, and temporary values and final result included in the calculation results. The temporary values may refer to such values which are obtained in the course of calculating some of the equations; which are obtained by calculating some of the equations and are also needed in calculating some other equations; and which is to be updated for each macroblock (or picture) by using those of the previous macroblock (or picture). That is, it refers to all values which is provided from the arithmetic unit 130 in the course of providing the final result. In the above equations, values of $T_i$, $T_p$, $T_b$, R, $d_m^i$, $d_m^p$ and $d_m^b$ in are some of examples of the temporary values. The memory and I/O unit 150 is also controlled to output final result of the calculation, i.e., inter/intra, field/frame DCT modes and the quantization parameter, to the DPCM and the Q blocks 20 and 30 shown in FIG. 1. More detailed description of the operation of the memory and I/O unit 150 and the arithmetic unit 130 will be given with reference to FIGS. 3 and 4 to 13, respectively.

Figure 3:
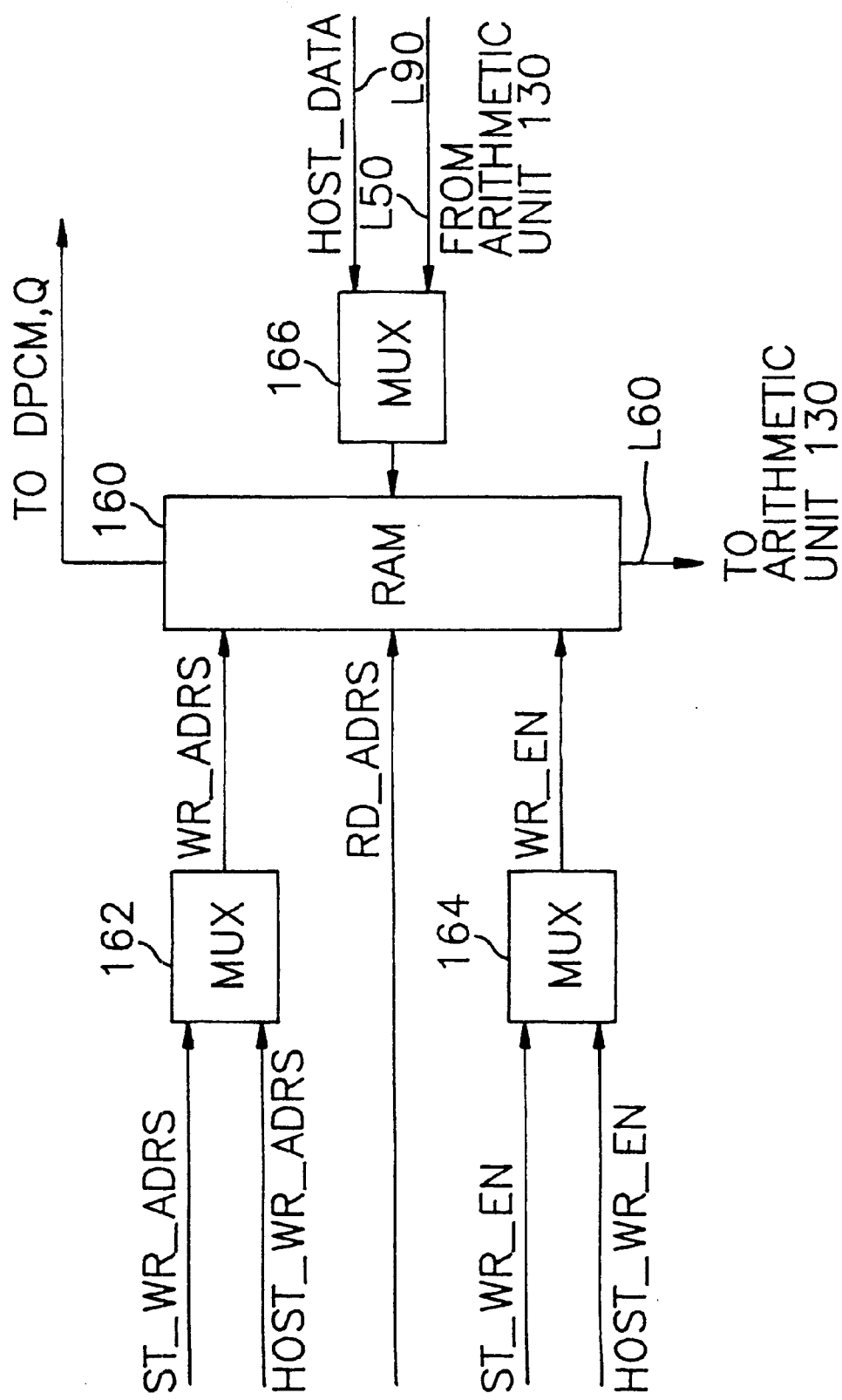
FIG. 3 represents a block diagram of a memory and I/O unit shown in FIG. 2.

Referring to FIG. 3, there is a block diagram of the memory and I/O unit 150 shown in FIG. 2.

HOST_DATA denotes the initial constant values which are used in performing the equations at the arithmetic unit 130. BIT_RATE, PICTURE_RATE, $K_p$ and $K_b$ in Eqs. 4A to 4C, initial constant values of $X_i$, $X_p$, $X_b$, R, $N_p$, $N_b$, $d_0^i$, $d_0^p$ and $d_0^b$ at the start of encoding process are examples of such initial constants provided as HOST_DATA. They are provided from the host processor which serves to store and provide the various initial constant values which are predetermined according to, e.g., a system design. At the start of encoding an image sequence, all the necessary constants are provided and stored at a RAM (Random Access Memory) 160 via a MUX (Multiplexor) 166 on L90. At the time some of them are necessary at the arithmetic unit 130 in performing above mentioned equations, they are provided from the RAM 160 to the arithmetic unit 130 on L60.

The calculation result obtained at the arithmetic unit 130 are also fed to the MUX 166 via L50 and stored at the RAM 160. Examples of such calculation results are R, $N_p$, $N_b$, $T_i$, $T_p$, $T_b$ and so forth. R is the remaining number of bits assigned to the current GOP determined as specified by Eq. (5), which is stored in the RAM 160 and updated at the arithmetic unit 130 after a frame is encoded. $N_p$ and $N_b$ are the respective numbers of P and B pictures remaining in the current GOP, which are used in calculating the target bit number $T_i$, $T_p$ and $T_b$ according to Eqs. 4A to 4C. In addition, the temporary values obtained in the course of calculating Eqs. 1A, 1B, 9, 10 and 11 and obtained by calculating Eqs. 2A and 2B are also provided to the RAM 160, to be stored therein, as will be explained with reference to FIG. 12.

ST_WR_ADRS and HOST_WR_ADRS are address signals used to write data, i.e., data from the arithmetic unit 130 inputted via the MUX 166 and HOST_DATA, to the RAM 160, respectively. ST_WR_EN and HOST_WR_EN are enable signals which go to active state when data is written to the RAM 160.

While an initial constant value is being fed to the RAM 160, MUXes 162, 164 and 166 select HOST_WR_ADRS, HOST_WR_EN and HOST_DATA, respectively, HOST_WR_ADRS denoting the address of the RAM 160 where the initial constant value is to be stored and HOST_WR_EN being an active state. Similarly, while the calculation result from the arithmetic unit 130 is inputted to the RAM 160, the MUXes 162, 164 and 166 select ST_WR_ADRS, ST_WR_EN and data on L50, respectively, ST_WR_ADRS denoting the address of the RAM 160 where the calculation result is to be stored and ST_WR_EN being an active state.

RD_ADRS is an address signal used to read data stored at the RAM 160 and to provide it either to the arithmetic unit 130, or the DPCM or Q block shown in FIG. 1. Specifically, the initial constant values, the temporary values and the result determined at the arithmetic unit 130 are read from the RAM 160 and provided back to the arithmetic unit 130 via L60. Meanwhile, the final results of three kinds of decisions, that is, the inter/intra and the field/frame DCT modes and the quantization parameter decision results $Mquant_m$, are fed to the DPCM and Q blocks shown in FIG. 1. ST_WR_ADRS, HOST_WR_ADRS, RD_ADRS, ST_WR_EN and HOST_WR_EN explained above are part of the control sequence provided via L80 from the state machine 120.

Figure 4:
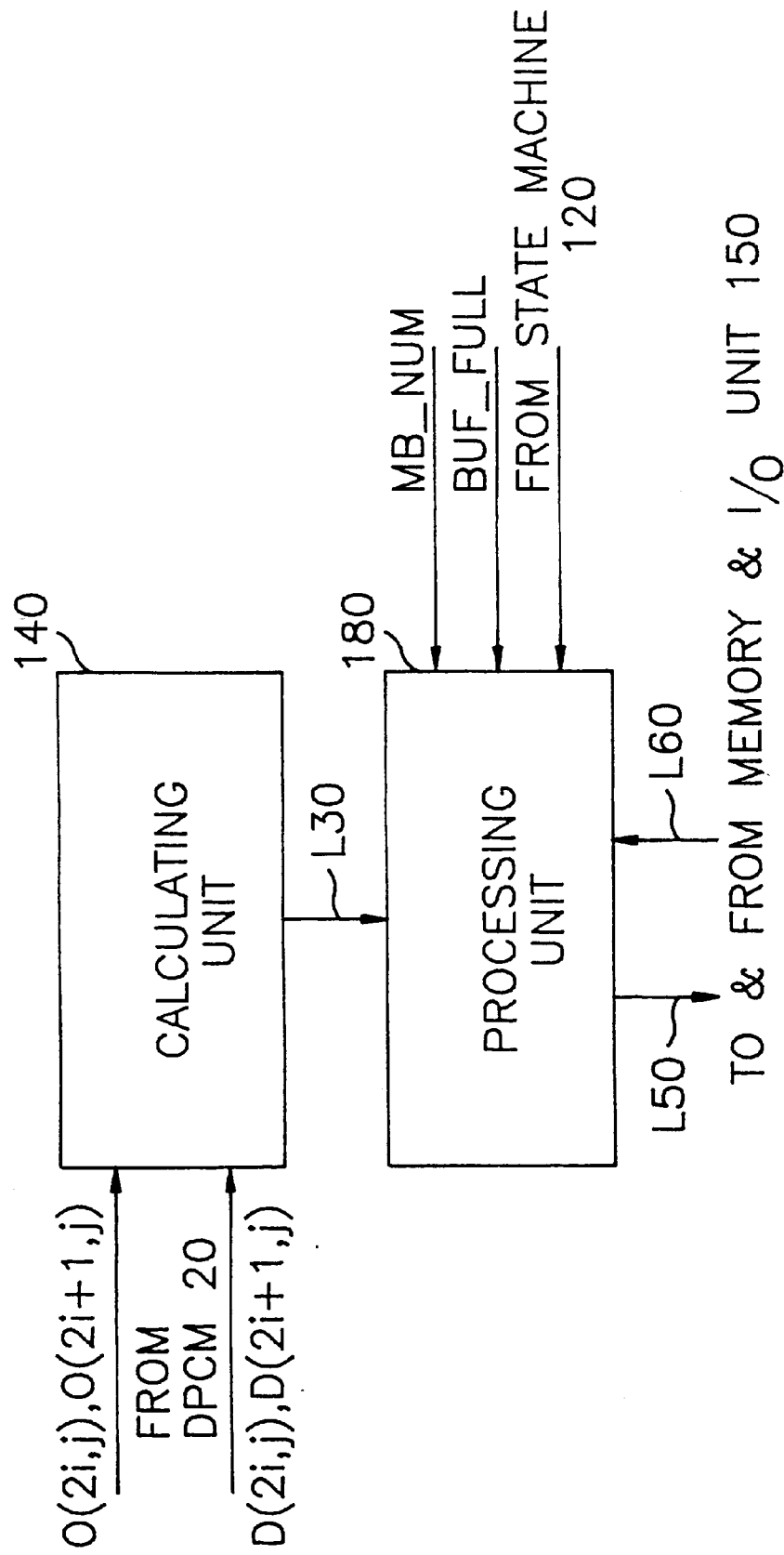
FIG. 4 provides a block diagram of a arithmetic unit shown in FIG. 2.

Referring to FIG. 4, there is provided a block diagram of the arithmetic unit 130 shown in FIG. 2, which includes a calculating unit 140 and a processing unit 180.

The calculating unit 140 receives the differential and the current frame data provided from the DPCM block 20 and provides a first set of temporary values to the processing unit 180. The differential and the current frame data are provided in pairs. That is, values of two neighboring pixels in a same line are provided during a same clock cycle. O(2i,j) and O(2i+1,j) denoting pixel values of the current frame data and D(2i,j) and D(2i+1,j) denoting pixel values of the differential frame data are such pairs, wherein i and j being integers denoting the position of the pixels in a frame. The first set of temporary values provided from the calculating unit 140 to the processing unit 180 will be explained with reference to FIGS. 5 to 9 and 11.

In addition to the first set of temporary values provided from the calculating unit 140, MB_NUM, BUF_FULL and the control sequence are fed to the processing unit 180 from the controlling unit 110, the buffer 60, and the state machine 120, respectively. The processing unit 180 are also coupled to the memory and I/O unit 150 so that it receives therefrom or provides thereto various data, such as the calculation result and the initial constant.

Figure 5:
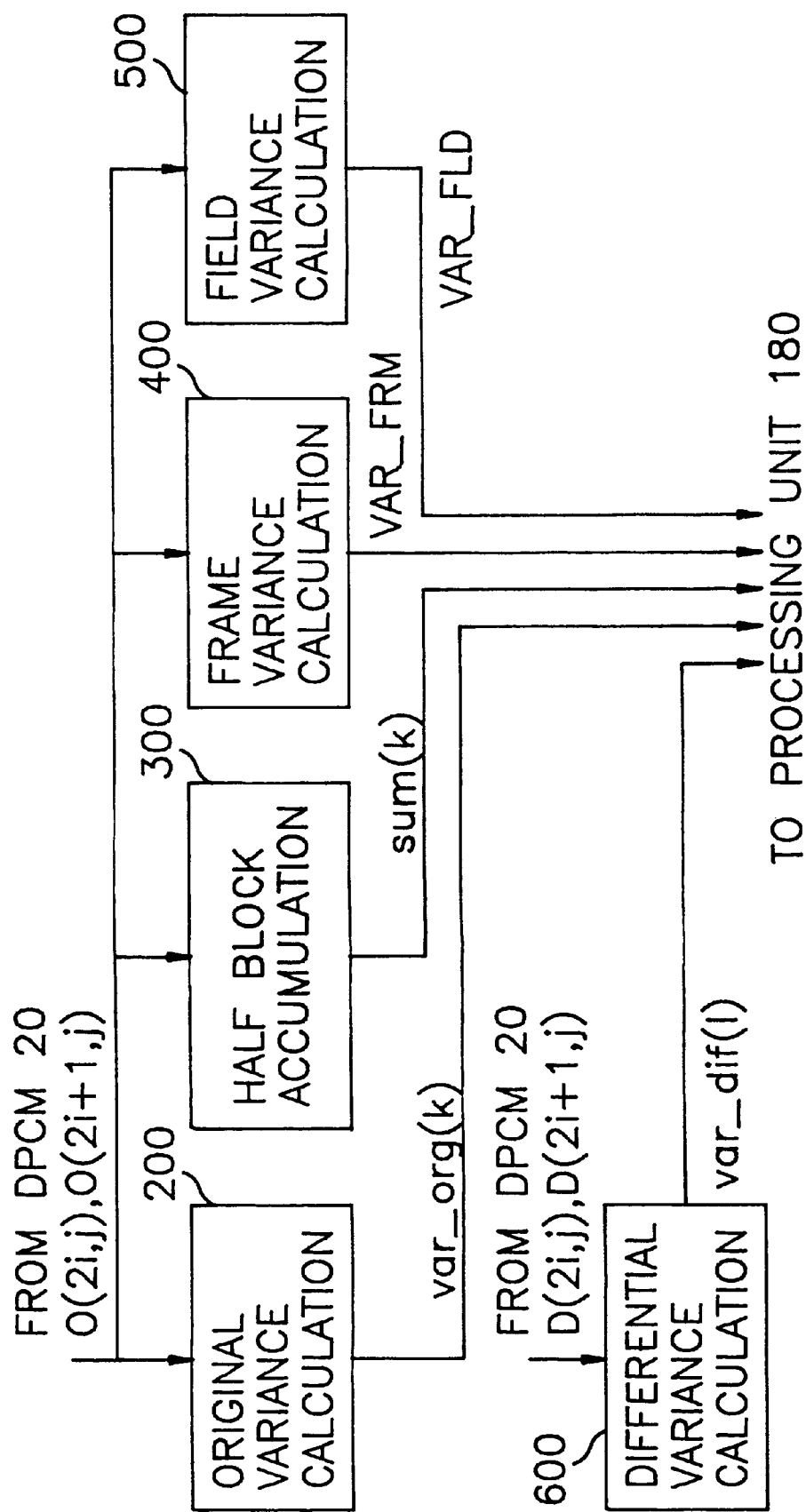
FIG. 5 illustrates a detailed block diagram of a calculation unit shown in FIG. 4.

Referring to FIG. 5, there are shown 5 blocks included in the calculating unit 140, which provide the first set of temporary values. The first set of temporary values are such values as are obtained by summing values related to pixel values, e.g., squares of pixel values or differences between two pixel values, for a half-block, a block, or a macroblock, wherein the half-block refers to 4 odd numbered lines or 4 even numbered lines as shown in FIG. 11.

Figure 11:
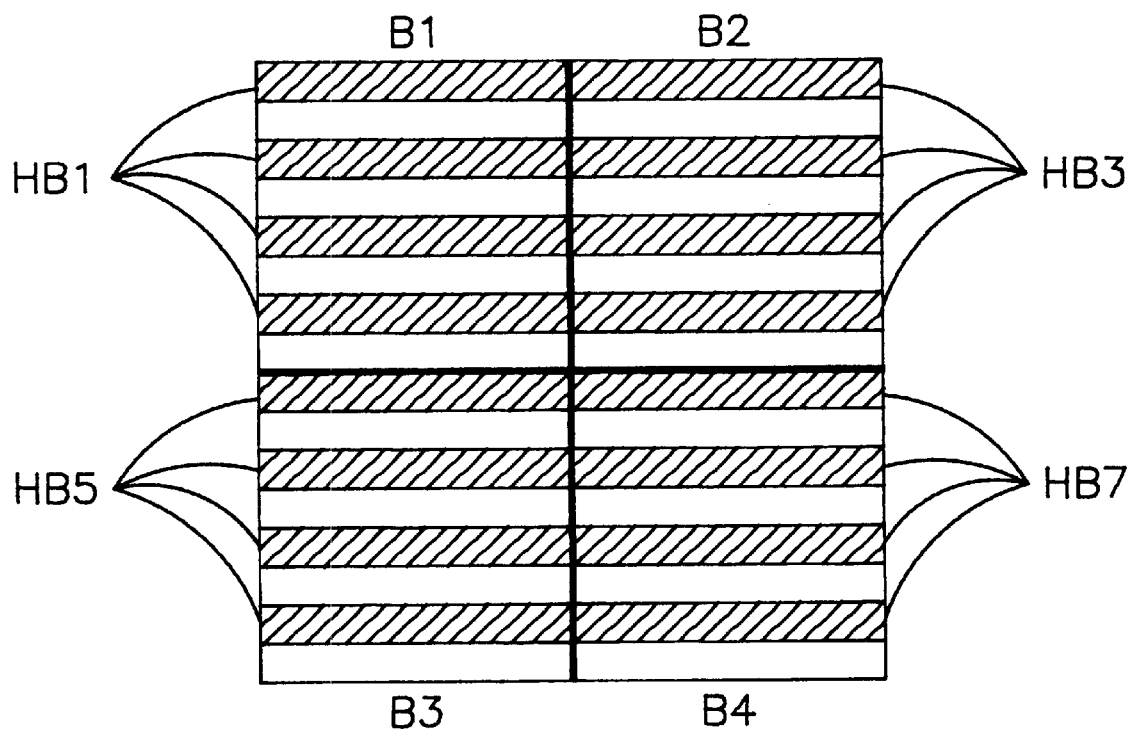
FIG. 11 is for explaining var_org(k), sum(k) and var_dif(l) provided from the calculation blocks shown in FIGS. 6 to 8.

In FIG. 11, there is shown an exemplary structure of a macroblock which includes 4 frame-organized blocks (B1 to B4), each block including 2 half-blocks. B1, B2, B3 and B4 include HB1 (half-block) and HB2; HB3 and HB4; HB5 and HB6; and HB7 and HB8, respectively, wherein each of odd numbered half-blocks (HB1, HB3, HB5, HB7) contains odd numbered lines (line1, line3, line5, line7) and each of even numbered half-blocks (HB2, HB4, HB6, HB8) contains even numbered lines (line2, line4, line6, line8). The macroblock may also be structured to include 4 field-organized blocks (B5 to B8, not shown), wherein B5, B6, B7 and B8 include HB1 and HB5; HB2 and HB6; HB3 and HB7; and HB4 and HB8, respectively.

An original variance calculation block 200 and a half-block accumulation block 300 provide the temporary values on a half-block basis; a differential variance calculation block 600 provides the temporary value on a block-by-block basis; and a frame and a field variance calculation blocks 400 and 500 provide the temporary values on a macroblock basis.

The original variance calculation block 200 provides var_org(k), k being an index identifying a half-block included in a macroblock and ranging from 1 to MK, MK being the number of half-blocks included in a macroblock, e.g., 8, wherein the var_org(k) is a sum of squares of, e.g., 32, pixel values included in a k-th half-block contained in a macroblock of the current frame data.

The differential variance calculation block 600 provides var_dif(l), i.e., a sum of squares of, e.g., 64, pixel values included in an l-th block contained in a macroblock of the differential frame data, l being an index identifying a frame-organized block included in a macroblock and ranigng from 1 to, e.g., 4.

The half-block accumulation block 300 supplies sum(k), i.e., a sum of, e.g., 32, pixel values included in each half-block of the current frame data, to the processing unit 180.

The var_dif(l) is used in calculating Eq. (1A); the var_org(k) and the sum(k) are used in calculating Eqs. (1B) and (10). By using these values, Eqs. (1A), (1B) and (10) may be modified as follows:

$$VAR\_DIF = \frac{\sum_{l=1}^{ML} var\_dif(l)}{256} \qquad \text{Eq. (1 A')}$$

$$VAR\_ORG = \frac{\sum_{k=1}^{MK}[var\_org(k) - \text{sum}(k)]}{256} \qquad \text{Eq. (1 B')}$$

$$var\_ll = \frac{\sum_k var\_org(k) - \sum_k \text{sum}(k)}{64} \qquad \text{Eq. (10')}$$

wherein 11 is an index identifying a frame-organized or a field-organized block and ranging between 1 and ML, ML being a number of the blocks (including frame-organized and field-organized blocks) contained in a macroblock, e.g., 8; and the summations in Eq. (10') are performed for half-blocks included in the 11-th block. For a frame-organized block (B1) and a field-organized block (B5), Eq. (10') is stated as follows:

$$var\_1 = \frac{var\_org(1) + var\_org(2) - \text{sum}(1) - \text{sum}(2)}{64}$$

$$var\_5 = \frac{var\_org(1) + var\_org(5) - \text{sum}(1) - \text{sum}(5)}{64}$$

The frame and the field variance calculation blocks 400 and 500 provide VAR_FRM and VAR_FLD according to Eqs. (2A) and (2B).

The first set of temporary values including var_dif(l), the var_org(k), the sum(k), the VAR_FRM, and the VAR_FLD are provided to the processing unit 180, to be used in the inter/intra and the field/frame DCT mode and the quantization parameter decisions.

Figure 6:
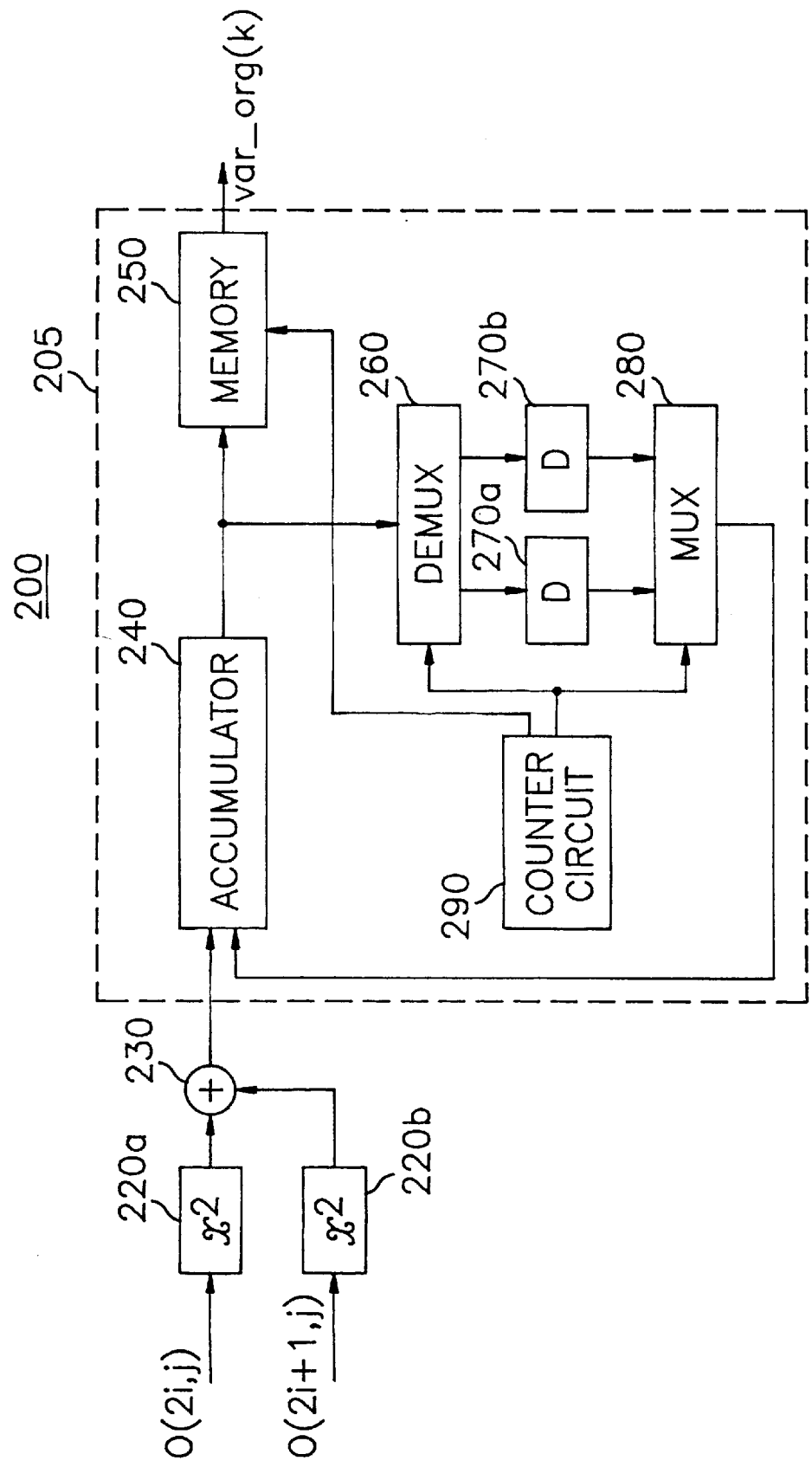
FIGS. 6 to 9 gives a detailed block diagram of calculation blocks shown in FIG. 5.

Referring to FIG. 6, there is shown a block diagram of the original variance calculation block 200 which includes two squaring block 220a and 220b, an adder 230 and a half-block accumulation circuit 205. As the current frame data (O(2i,j), O(2i+1, j)) is provided to the original variance calculation block 200 in the form of frame-organized blocks, two var_org(k)'s of two half-blocks included in a frame-organized block are provided after pixel values included in the frame-organized block are inputted thereto.

The detailed operation of the original variance calculation block 200 will be illustrated for a block B1 including HB1 and HB2. Before calculating var_org(1) and var_org(2), delay blocks 270a and 270b and a content of a counter circuit 290 are initialized to 0. First, O(0,0) and O(1,0) are squared at the squaring blocks 220a and 220b, respectively, and added at the adder 230. At an accumulator 240, the squared sum, O(0,0)²+O(1,0)² is added to 0 provided through a multiplexor("MUX") 280 from the delay block 270a and the result is provided back through a demultiplexor ("DEMUX") 260 to the delay block 270a. In a same manner, O(2,0) and O(3,0) are squared and added, and then added to O(0,0)²+O(0,0)² provided from the delay block 270a. While a first line of a block is being processed, only the delay block 270a is utilized. That is, the counter circuit 290 controls the DEMUX 260 to provide an input thereto to the delay block 270a and controls the MUX 280 to select an input provided from the delay block 270a. In this manner, a sum of squares of, e.g., 8, pixel values included in the first line is stored at the delay block 270a.

Similarly, a sum of squares of, e.g., 8, pixel values included in a second line is obtained and stored at the delay block 270b. To do this, while a second line of a block is being processed, the counter circuit 290 controls the DEMUX 260 and the MUX 280 so that the delay block 270b is utilized.

Subsequently, sums of squares of pixels included in odd-numbered and even-numbered lines are added to the contents of the delay blocks 270a and 270b, respectively, to provide var_org(1) and var_org(2) to a memory 250. Specifically, after O(6,6)²+O(7,6)² is added to the contents of the delay block 270a, the var_org(1) is provided from the accumulator 240 to the memory 250; and after O(6,7)²+O(7,7)² is added to the contents of the delay block 270b, the var_org(2) is provided from the accumulator 240 to the memory 250. The memory 250 provides the var_org(1) and the var_org(2) to the processing unit 180.

Figure 7:
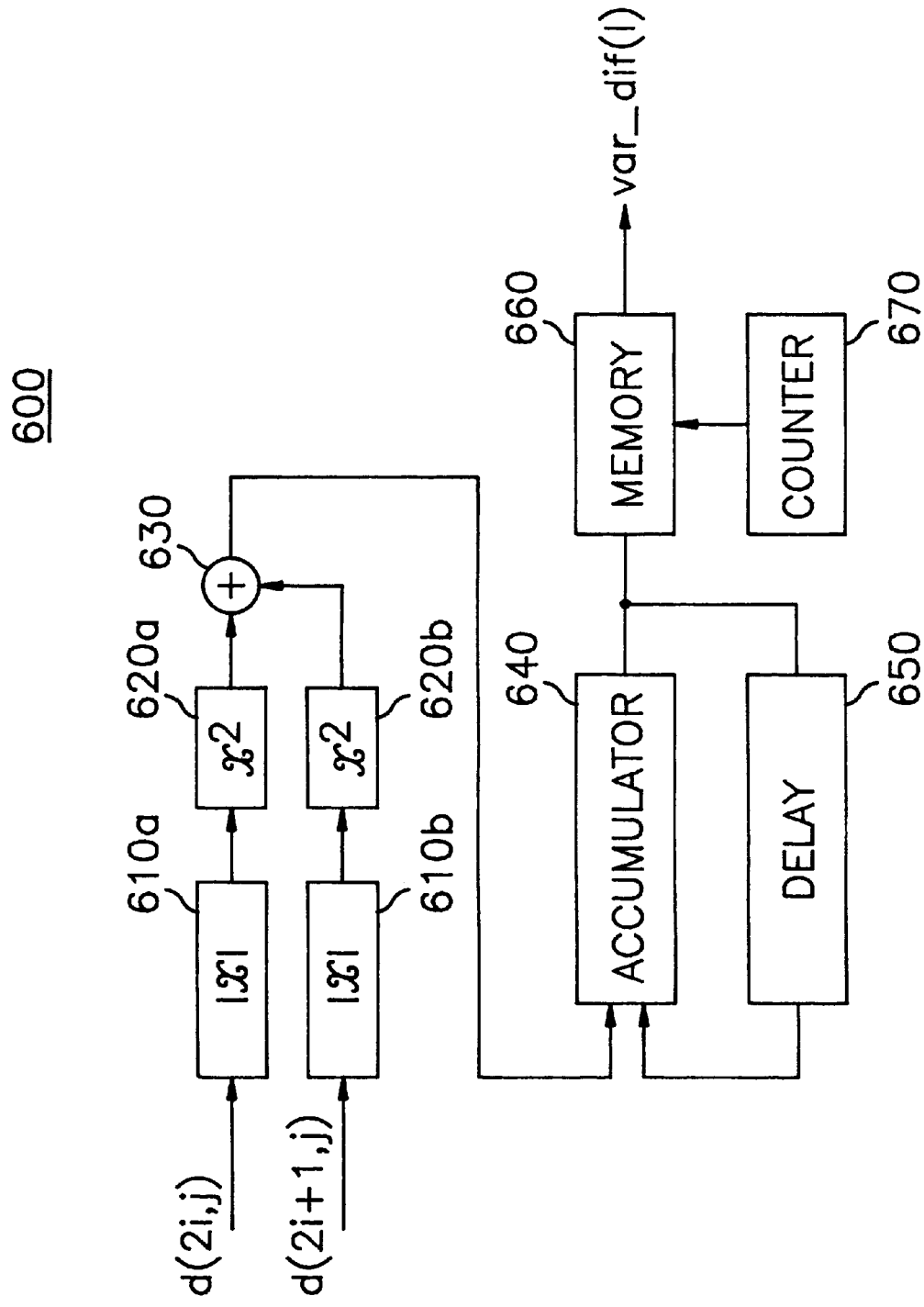

Referring to FIG. 7, there is shown a block diagram of the differential variance calculation block 600 which provides the var_dif(l), l being an index identifying a frame-organized block included in a macroblock. Unlike the original variance calculation block 200, it provides a sum of squares of all pixel values included in a frame-organized block. Before a block of pixels are processed therein, contents of a delay block 650 and a counter 670 are initialized with 0. Differential data D(0,0) and D(1,0) are inputted to absolute value blocks 610a and 610b wherein signs thereof are removed. By doing this, two squaring block 620a and 620b can be easily implemented as they need not deal with signed values. D(0,0)² and D(1,0)² provided from the squaring blocks 620a and 620b are added at an adder 630, then, added to 0 provided from the delay block 650 at an accumulator 640, to provide the result back to the delay block 650. Then, D(2,0)² and D(3,0)² are added at the adder 630 and summed to D(0,0)² +D(1,0)² provided from the delay block 650 at the accumulator 640, to provide the result back to the delay block 650. After squares of all pixel values included in a block are summed, e.g., after 32 clock cycles, the var_dif(l) is stored at a memory 660 in response to a control signal provided from the counter 670 and provided to the processing unit 180.

Figure 8:
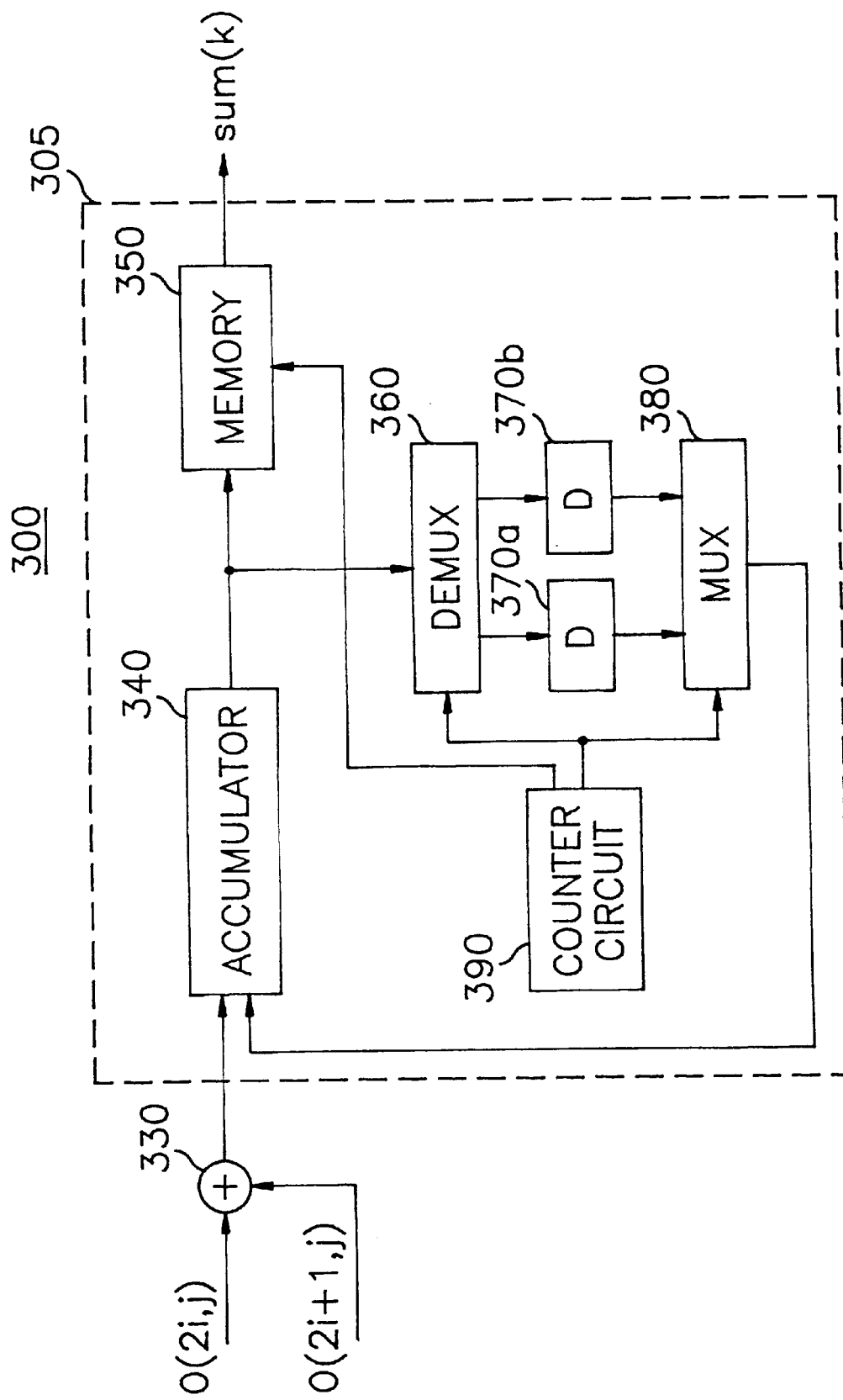

Referring to FIG. 8, there is shown a block diagram of the half-block accumulation block 300 which supplies the sum (k), i.e., a sum of pixel values included in a half-block k. It includes an adder 330 and a half-block accumulation circuit 305 which is identical in structure to the one shown in FIG. 6. Therefore, the operation of the half-block accumulation block 300 is essentially same as that of the original variance calculation block 200 except that pixel values instead of squares of them are accumulated therein. Upon receiving pixel values of a frame-organized block l, l being 1, 2, 3 or 4, a sums of pixel values of two half-blocks included therein, i.e., sum(k) and sum(k+1), k being (2l−1), are provided from a memory 350 to the processing unit 180.

Figure 9:
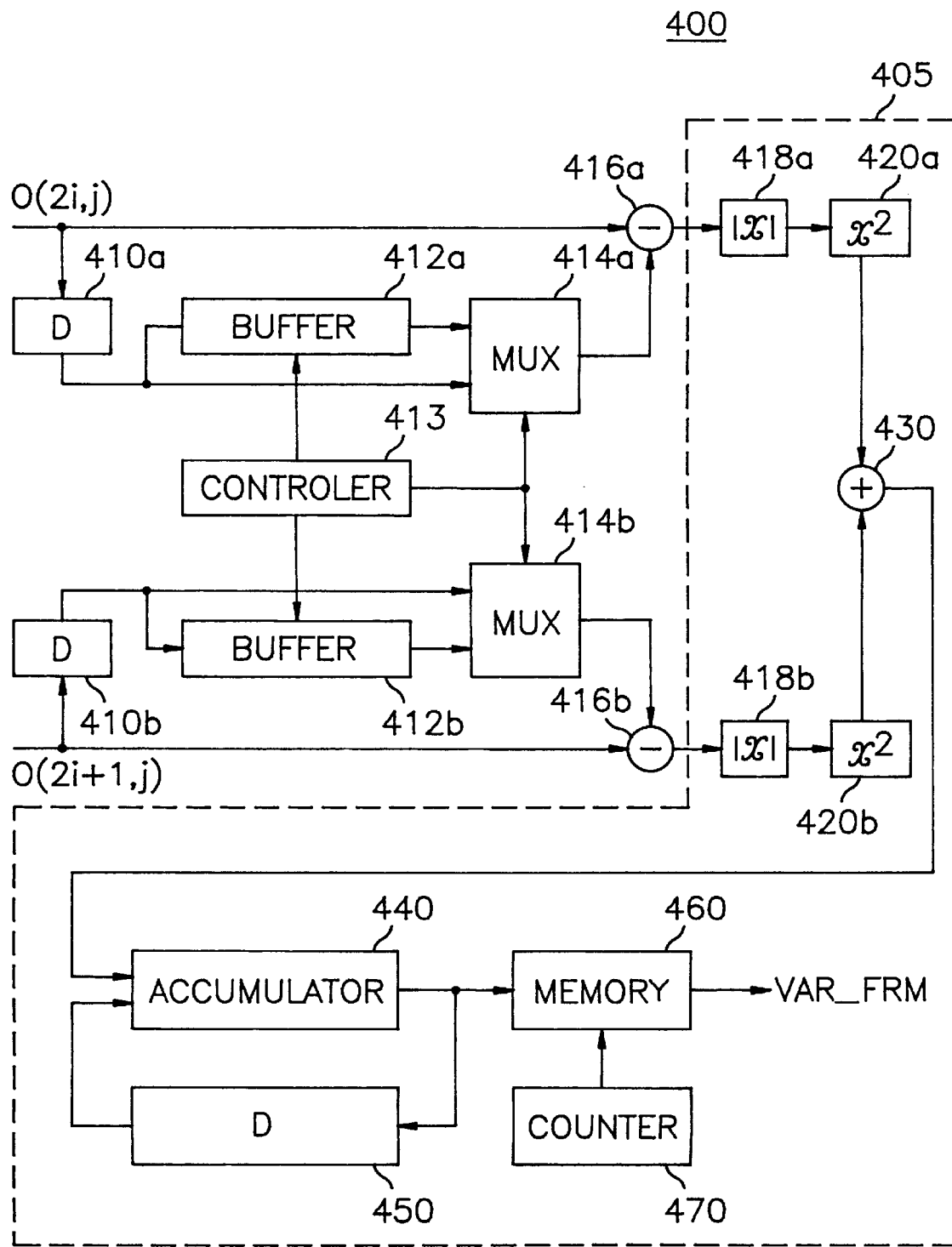
Figure 10:
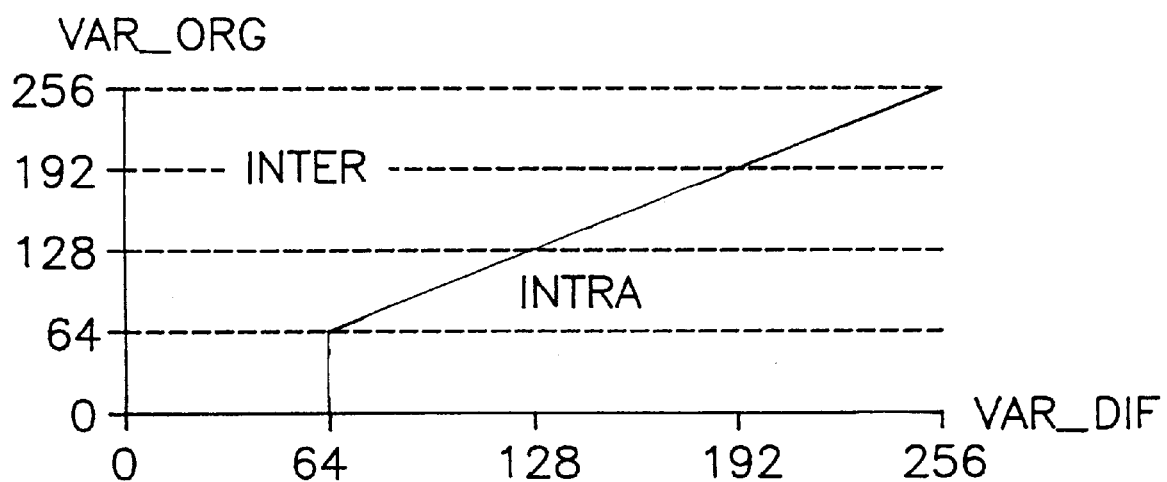
FIG. 10 denotes a method for deciding an inter/intra mode by using VAR_DIF and VAR_ORG.

Referring to FIG. 9, there is shown a block diagram of the frame variance calculation block 400 which provides the VAR_FRM. It includes two delay blocks 410a and 410b, two buffers 412a and 412b, a controller 413, two MUXes 414a and 414b, two subtractors 416a and 416b and a squaring and accumulating circuit 405. The structure of the squaring and accumulating circuit 405 is identical to the differential variance calculation block 600 shown FIG. 7 and the operation thereof is similar, too. Each of the delay blocks 410a and 410b is a line delay for delaying input thereto by a line of a block, e.g., 8 clock cycles. Each of the buffers 412a and 412b can store one line of a block, e.g., 8 pixel values. As shown in Eq. (2A), the VAR_FRM is determined on a macroblock basis. However, the current frame data is provided on a block-by-block basis. Therefore, Eq. (1A) is divided into following 6 sub-equations to conform to the input data format.

$$VAR\_FRM(1) = \sum_{i=0}^{7}\sum_{j=1}^{7}[O_{B1}(i,j-1) - O_{B1}(i,j)]^2 \quad \text{Eq. (2A-1)}$$

$$VAR\_FRM(2) = \quad \text{Eq. (2A-2)}$$
$$VAR\_FRM(1) + \sum_{i=0}^{7}\sum_{j=1}^{7}[O_{B2}(i,j-1) - O_{B2}(i,j)]^2$$

$$VAR\_FRM(3) = \quad \text{Eq. (2A-3)}$$
$$VAR\_FRM(2) + \sum_{i=0}^{7}[O_{B1}(i,7) - O_{B3}(i,0)]^2$$

$$VAR\_FRM(4) = \quad \text{Eq. (2A-4)}$$
$$VAR\_FRM(3) + \sum_{i=0}^{7}\sum_{j=1}^{6}[O_{B3}(i,j-1) - O_{B3}(i,j)]^2$$

$$VAR\_FRM(5) = \quad \text{Eq. (2A-5)}$$
$$VAR\_FRM(4) + \sum_{i=0}^{7}[O_{B2}(i,7) - O_{B4}(i,0)]^2$$

$$VAR\_FRM = \quad \text{Eq. (2A-6)}$$
$$VAR\_FRM(5) + \sum_{i=0}^{7}\sum_{j=1}^{6}[O_{B4}(i,j-1) - O_{B4}(i,j)]^2$$

In the above equations, $O_{B1}(i,j)$ $O_{B2}(i,j)$, $O_{B3}(i,j)$ and $O_{B4}(i,j)$ are pixel values included in the frame-organized blocks B1, B2, B3 and B4, respectively.

Pixel values included in B1 is inputted to the delay blocks 410a and 410b wherein they are delayed for, e.g., 8 clock cycles. Therefore, when O(0,0) and O(1,0) are fed through the MUXes 414a and 414b to the subtractors 416a and 416b, respectively, O(0,1) and O(1,1) are fed to the subtractors 416a and 416b, to thereby provide the differences therebetween to absolute value blocks 418a and 418b, respectively. In this manner, while second to eighth lines of B1 are provided to the frame variance calculation block 400, the differences between two consecutive lines of B1 are added and accumulated at the squaring and accumulating block 405, to provide VAR_FRM(1) of Eq. (2A-1). Then, while receiving first line of B2, a last line of B1 is stored at the buffers 412a and 412b in response to a control signal provided from the controller 413; $O_{B1}(0,7)$, $O_{B1}(2,7)$, $O_{B1}(4,7)$ and $O_{B1}(6,7)$ are stored at the buffer 412a and $O_{B1}(1,7)$, $O_{B1}(3,7)$ $O_{B1}(5,7)$ and $O_{B1}(7,7)$ are stored at the buffer 412b. Subsequently, while receiving second to eighth lines of B2, the frame variance calculating block 400 calculates VAR_FRM(2) according to Eq. (2A-2). It should be noted that while a first line of B1 or B2 is inputted to the frame variance calculating block 400, the squaring and accumulating operation is not performed.

Then, while receiving a first line of B3, a last line of B2 is stored at the buffers 412a and 412b in response to the control signal provided from the controller 413; $O_{B2}(0,7)$, $O_{B2}(2,7)$, $O_{B2}(4,7)$ and $O_{B2}(6,7)$ are stored at the buffer 412a and $O_{B2}(1,7)$ $O_{B2}(3,7)$, $O_{B2}(5,7)$ and $O_{B2}(7,7)$ are stored at the buffer 412b. At the same time, the differences between the last line of B1 and the first line of B3 are squared and summed, to thereby provide VAR_FRM(3). To do this, while $O_{B3}(i,O)$'s are provided to the subtractors 416a and 416b, the MUXes 414a and 414b select and provide $O_{B1}(i,7)$'s provided from the buffers 412a and 412b, to the subtractors 416a and 416b in response to control signals provided from the controller 413.

Similarly, while receiving second to seventh lines of B3, the frame variance calculating block 400 calculates VAR_FRM(4); while a first line of B4 is inputted, the differences between the last line of B2 and the first line of B4 are squared and summed, to thereby provide VAR_FRM(5); and while receiving second to seventh lines of B4, the frame variance calculating block 400 calculates the VAR_FRM. To enable the above explained procedure, the controller 413 provides various control signals. For example, the controller 413 provides write and read address signals and a write enable signal, to the buffers 412a and 412b and supplies selection signals to the MUXes 414a and 414b so that the MUXes 414a and 414b selects pixel values provided from the buffers 412a and 412b while calculating VAR_FRM(3) and VAR_FRM(5) and selects inputs provided from the delay blocks 410a and 410b while calculating VAR_FRM (1), VAR_FRM(2), VAR_FRM(4), VAR_FRM(6).

A block diagram of the field variance calculation block 500 (not shown) and operation thereof are similar to that of the frame variance calculation block 400. However, each of the delay blocks included in the field variance calculation block 500 is a line delay for delaying input thereto by two lines of a block, e.g., 16 clock cycles; and each of the buffers therein can store 2 lines of a block, e.g., 16 pixel values.

Figure 12:
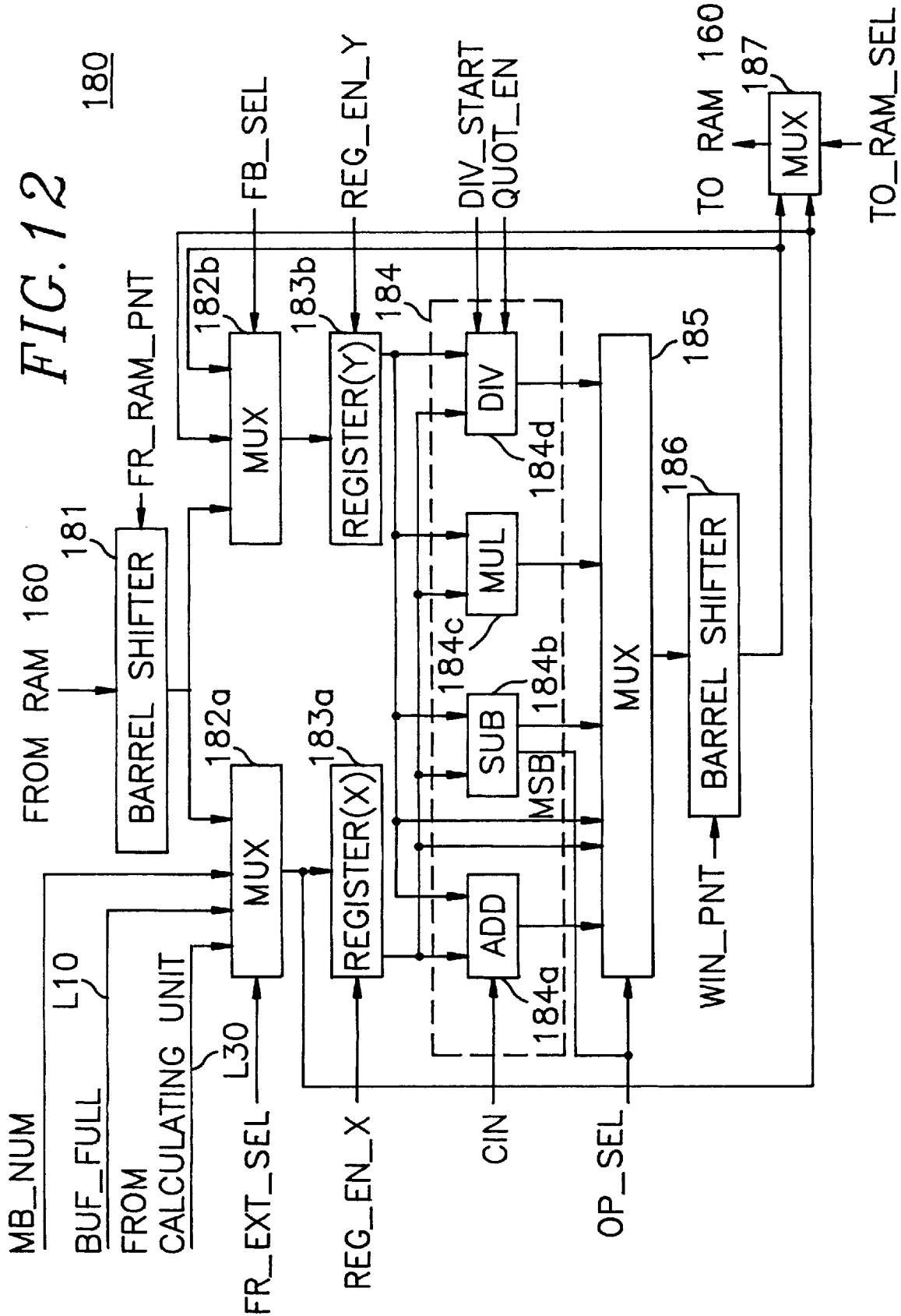
FIG. 12 describes a detailed block diagram of the processing unit shown in FIG. 4.

Referring to FIG. 12, there is provided a block diagram of the processing unit 180 shown in FIG. 4.

MB_NUM and BUF_FULL are fed to a MUX 182a from the controlling unit 110 and the buffer 60, respectively. The first set of temporary values provided from the calculating unit 140 is also fed to the MUX 182a. As described above, the initial constant values and the temporary values are provided from the memory and I/O unit 150 via L60, more specifically, from the RAM 160 shown in FIG. 3.

FR_EXT_SEL, REG_EN_X, REG_EN_Y, CIN, OPERATION_SEL, FEED_BACK_SEL, DIV_START, QUOT_EN, TO_RAM_SEL, WINDOW_PNT and FR_RAM_PNT are control signals which are included in the control sequence provided from the state machine 120 shown in FIG. 2. The various elements of the processing unit 180 shown in FIG. 4 are controlled to perform arithmetic tasks according to the control sequence. The function of the control signals will now be presented.

(1) FR_RAM_PNT (or WIN_PNT) is valid when data is inputted to a barrel shifter 181 (or 186). The value of FR_RAM_PNT (or WIN_PNT) denotes the number of bits by which the input data is shifted at the barrel shifter 181 (or 186). For example, if FR_RAM_PNT is '2', output of the barrel shifter 181 is four times the input thereto.

(2) FR_EXT_SEL (or FB_SEL)

represents which of the inputs to the MUX 182a (or 182b) is selected and provided to REGISTER(X) 183a (or REGISTER(Y) 183b).

(3) REG_EN_X (or REG_EN_Y)

is in a valid state while data is being stored at REGISTER (X) (or REGISTER(Y))

(4) CIN, DIV_START, QUOT_START

These are signals for controlling a calculation block 184.

CIN denotes whether an ADD (Adder) 184a provide an addition result of two operands from REGISTER(X) and REGISTER(Y), or further increments the addition result by one.

DIV_START notifies the start of division operation to a DIV (DIVider) 184d.

QUOT_EN represents when a result of division, i.e., a quotient, is outputted from the DIV 184d. It should be enabled for one clock cycle after a latency of the DIV 184d from the start of the division.

Note that for other blocks included in the calculation block 184, i.e., the ADD 184a, a SUB (SUBtractor) 184b and a MUL (MULtiplier) 184c, an initiation or start signal is not used. On reading operands from REGISTER(X) and/or REGISTER(Y) inputted thereto, ADD, SUB, and MUL perform corresponding operations without waiting a start signal. Also note that for ADD, SUB and MUL, a signal corresponding to QUOT_EN is not used. On finishing calculation, the ADD 184a, the SUB 184b, and the MUL 184c output the result promptly. The ADD 184a and the SUB 184b provide the result without a delay while the DIV 184d and the MUL 184c output the result after a predetermined delay.

(5) OP_SEL indicates to a MUX 185 one of the operation results which are obtained at the calculation block 184. The calculation block 184 performs an addition, a subtraction, a multiplication and a division by using corresponding blocks, i.e., the ADD 184a, the SUB 184b, the MUL 184c and the DIV 184d, respectively. Other than these four operations, the calculation block 184 together with the MUX 185 compares two operands A and B, from the REGISTER(X) 183a and the REGISTER(Y) 183b, respectively. Comparison is performed by first subtracting one operand(B) from the other (A) and then by selecting one of the operands at the MUX 185 according to a sign of the subtraction result. As shown in FIG. 12, MSB or sign bit of the output from the SUB 184b constitutes one bit of OP_SEL, thereby affecting the selection. For example, in case the sign is '+', A is selected as the output of the MUX 185; otherwise B is selected.

(6) TO_RAM_SEL is valid while data from the processing unit 180 is being written to the RAM 160. It also denotes which of two inputs to a MUX 187, one from the MUX 182a and the other from the barrel shifter 186, is provided to the RAM 160.

Now, subblocks of the processing unit 180 will be described with an exemplary procedure for calculating $T_i$ according to the equation;

$$T_i = \max\left[\frac{R}{1 + \frac{N_p \times X_p}{X_i \times K_p} + \frac{N_b \times X_b}{X_i \times K_b}}, \frac{\text{BIT\_RATE}}{8 \times P\_\text{RATE}}\right]$$

First, a procedure for calculating $(N_p \times X_p)/(X_i \times K_p)$ will be presented. The procedure consists of following 10 steps. In each step, control signals, which are to be provided from the state machine 120 for doing the task allotted to that step, are specified along with its functions. The remaining control signals which are not specified in each step but are included in the control sequence, are in a "Don't care" state, which means that these signals are not relevant in doing the corresponding task.

[1] Reading $X_i$ from the RAM 160 to the REGISTER(X) 183a
RD_ADRS: address of $X_i$ in the RAM 160
FR_RAM_PNT: '0' (which means data from the RAM 160 is not
multiplied with $2^n$, n being a nonnegative integer)
FR_EXT_SEL: selects output from the barrel shifter 181.
REG_EN_X: enable the REGISTER(X) for 1 clock cycle to prevent other irrelevant data from being overwritten on $X_i$ value at the REGISTER(X).

[2] Reading $K_p$ from the RAM 160
RD_ADRS: address of $K_p$ in the RAM 160
FR_RAM_PNT: '0'
FB_SEL: selects output from the barrel shifter 181.
REG_EN_Y: enables the REGISTER(Y) 183b for 1 clock cycle to prevent other irrelevant data from being overwritten on $K_p$ value at the REGISTER(Y) 183b.

[3] Starting $X_i \times K_p$ and reading $N_p$
The two tasks are done simultaneously. In initiating $X_i \times K_p$, no control signal is necessary.
The followings are for reading $N_p$.
RD_ADRS: address of $N_p$ in the RAM 160
FR_RAM_PNT: '0'
FR_EXT_SEL: selects output from the barrel shifter 181.
REG_EN_X: enables REGISTER(X) for 1 clock cycle.

[4] Reading $X_p$ from the RAM 160
RD_ADRS: address of $X_p$ in the RAM 160
FR_RAM_PNT: '0'
FB_SEL: selects output from the barrel shifter 181.
REG_EN_Y: enables the REGISTER(Y) for 1 clock cycle.

[5] Starting $N_p \times X_p$ No control signal needed.

[6] Finishing $X_i \times K_p$ and writing the result to the RAM 160
OP_SEL: selects output from the MUL 184c.
WIN_PNT: '0' (means data from the MUX 185 is not multiplied with $2^n$.)
TO_RAM_SEL: selects output from the barrel shifter 186 and provides it to the RAM 160.

[7] Reading $X_i \times K_p$ from the RAM 160
RD_ADRS: address of $X_i \times K_p$
FR_RAM_PNT: '0' (which means data from the RAM 160 is not multiplied with $2^n$.)
FR_EXT_SEL: selects output from the barrel shifter 181.
REG_EN_X: enables the REGISTER(X) for 1 clock cycle.

[8] Finish $(N_p \times X_p)$ and feedback the result to REGISTER (Y)
OP_SEL: selects output from the MUL 184c.
WIN_PNT: '0'
FB_SEL: selects an output from the barrel shifter 186.
REG_EN_X: disables REGISTER(X) for 1 clock cycle.
REG_EN_Y: enables the REGISTER(Y) 183b for 1 clock cycle.

[9] Starting $(N_p \times X_p)/(X_i \times K_p)$
DIV_START: notifies the start of division to the DIV 184d.

[10] Finishing $(N_p \times X_p)/(X_i \times K_p)$ and writing the result to the RAM 160
QUOT_EN: couples the result of the division to the MUX 185.
OP_SEL: selects output from the DIV 184d.
WIN_PNT: '0'
TO_RAM_SEL: selects output from the barrel shifter 186.
ST_WR_ADRS: address where $(N_p \times X_p)/(X_i \times K_p)$ is written.
ST_WR_EN: enables writing operation of the RAM 160.
With a similar procedure as described above as step [1] to [10], $(N_b \times X_b)/(X_i \times K_b)$ is calculated and stored at the RAM 160. The result is also fed to the REGISTER(Y) 183b with the help of FB_SEL and REG_EN_Y. After that, steps [11] to [17] continue.

[11] Reading $(N_p \times X_p)/(X_i \times K_p)$ to the REGISTER(X) 183a similar to step [1]. Note that the data was stored at the RAM 160 at step [10].

[12] Calculating $1 + (N_b \times X_b)/(X_i \times K_b) + (N_p \times X_p)/(X_i \times K_p)$ and feeding the result to REGISTER(Y)
CIN: denotes that 1 is added to the addition result of two operands.
OP_SEL: selects output of the ADD 184a.
WIN_PNT: '0'

FB_SEL: selects output from the barrel shifter 186.
REG_EN_Y: enabled for 1 clock cycle.
[13] Reading R from the RAM 160 to the REGISTER(X) 183*a* similar to step [1].
[14] Starting $R/1+(N_b \times X_b)/(X_i \times K_b)+(N_p \times X_p)/(X_i \times K_p)$
DIV_START: notify the start of division to the DIV 184*d*.
[15] Finishing $R/1+(N_b \times X_b)/(X_i \times K_b)+(N_p \times X_p)/(X_i \times K_p)$ and feeding the result to REGISTER(Y)
QUOT_EN: couples the result of the division to the MUX 185.
OP_SEL: selects output from the DIV 184*d*.
WIN_PNT: '0'
FB_SEL: selects output from the barrel shifter 186.
REG_EN_Y: enables for 1 clock cycle.
[16] Reading BIT_RATE/(8×PICTURE_RATE) from the RAM 160 to REGISTER(X) similar to step [1].
[17] Comparing $R/1+(N_b \times X_b)/(X_i \times K_b)+(N_p \times X_p)/(X_i \times K_p)$ with BIT_RATE/(8×PICTURE_RATE), selecting a larger one and storing it to the RAM 160.
OP_SEL: select output from either REGISTER(X) or REGISTER(Y) depending on the sign bit (or MSB) of the SUB 184*b* output.
WIN_PNT: '0'
TO_RAM_SEL: selects output from the barrel shifter 186.
ST_WR_ADRS: denotes an address where $T_i$ is written.
ST_WR_EN: enables a writing operation of the RAM 160.
By doing the above procedure step by step, the calculation of $T_i$ given in Eq. (4A), which includes additions, multiplications, divisions, a comparison and data fetch from and storing at the RAM 160, is completed.

Now, the procedure for calculating VAR_ORG according to the following equation will be explained.

$$VAR\_ORG = \frac{\sum_{k=1}^{8}[var\_org(k) - \text{sum}(k)]}{256} \quad \text{Eq. (1B')}$$

When a temporary value included in the first set is generated from the calculating unit 140, it is provided to the MUX 182*a* in response to FR_EXT_SEL. Then, it is fed through the MUX 187 to the RAM 160, to be stored therein. After the var_org(k)'s and the sum(k)'s, k being 1 to 8, are stored at the RAM 160, the VAR_ORG may be calculated according to following steps:
[21] Reading var_org(1) from the RAM 160 to the REGISTER(X) 183*a*
RD_ADRS: address of var_org(1) in the RAM 160
FR_RAM_PNT: '0'
FR_EXT_SEL: selects output from the barrel shifter 181.
REG_EN_X: enable the REGISTER(X) 183*a* for 1 clock cycle.
[22] Reading var_org(2) from the RAM 160 to the REGISTER(Y) 183*b*
RD_ADRS: address of var_org(2) in the RAM 160
FR_RAM_PNT: '0'
FB_SEL: selects output from the barrel shifter 181.
REG_EN_Y: enables REGISTER(Y) for 1 clock cycle.
[23] Calculating var_org(1)+var_org(2) and feeding the result to the REGISTER(Y)
CIN: denotes that 1 is not added to the addition result of two operands.
OP_SEL: selects output of the ADD 184*a*.
WIN_PNT: '0'
FB_SEL: selects output from the barrel shifter 186.
REG_EN_Y: enables the REGISTER(Y) for 1 clock cycle.
[24] Reading var_org(3) from the RAM 160 to the REGISTER(X) 183*a* identical to step [21].
[25] Calculating {var_org(3)+contents of the REGISTER (Y) 183*b*} and feeding the result back to REGISTER(Y) identical to step [23].
[26] Reading var_org(4) from the RAM 160 to the REGISTER(X) 183*a* and calculating var_org(4)+contents of the REGISTER(Y) 183*b* and writing the result to the RAM 160.
In a similar manner, var_org(k)'s, k ranging from 1 to 8, are summed and stored at the RAM 160.
Then, a sum of sum(k)'s, k ranging from 1 to 8, are calculated in a similar manner and then fed to the REGISTER(Y) 183*b*.
Then following steps continues.
[27] Reading the sum of var_org(k)'s from the RAM 160 to the REGISTER(X) 183*a*.
[28] Subtract contents of the REGISTER(Y) 183*b* from that of the REGISTER(X) 183*a*, dividing the result by 256 and writing the result to the RAM 160.
OP_SEL: selects output of the SUB 184*b*.
WIN_PNT: '−8' (means data from the MUX 185 is divided by $2^8$)
TO_RAM_SEL: selects output from the barrel shifter 186 and provides it to the RAM 160.
As described above, VAR_ORG is calculated. Other equations may also be calculated in a similar manner. By obtaining the result of the equations, the three tasks designated to the controller 10 of the present invention are performed.

While the present invention has been described with respect to the particular embodiments, it will be apparent to those skilled in the art that various changes and modifications may be made without departing from the spirit and scope of the invention as defined in the following claims.

What is claimed is:

1. A controller, for use in a video signal encoding system, for deciding an inter/intra mode, a field/frame DCT mode and a quantization parameter, wherein the video signal contains a multiplicity of GOP's, each of the GOP's being classified into three types of frames, each of the frames being divided into a multiplicity of macroblocks, each macroblocks consisting of a plurality of blocks, each block including a half-block having odd-numbered lines and a half-block having even-numbered lines, and the encoding system encodes the video signal on a macroblock basis, said controller comprising:

means for generating a control sequence which includes a plurality of control signals in response to a signal denoting a start of and a type of a frame currently encoded;

a calculation unit for providing a first set of values by calculating a first group of predetermined equations;

processing means for providing a set of control values for each of the macroblocks in the frame in response to the control sequence and the first set of values, the set of control values denoting the inter/intra mode, the field/frame DCT mode and the quantization parameter, by calculating a second group of predetermined equations based on the sequential number of a macroblock currently encoded and predetermined initial constant values; and a memory and input/output unit for storing the initial constant values, providing the initial constant values to the processing means, storing the set of control values determined at the processing means and providing the control values to be used in encoding the video signal, wherein the processing means includes:

a first input means for selecting a first input value among a first set of input values;

a second input means for selecting a second input value among a second set of input values, the second set containing the first input value selected at the first input means;

a first and second registers for storing the first and the second input values, respectively;

a calculation means for performing an addition, a subtraction, a multiplication, a division and a comparison of the first and the second input values, to thereby provide a set of calculation results consisting of an addition result, a multiplication result, a subtraction result, a division result and a comparison result;

a selection means for selecting one of the calculation results; and an output means for providing the selected calculation result or the first input value either to the second input means as one of the second set of input values or to the memory and input/output unit.

2. The controller of claim 1 wherein said memory and the input/output unit includes:

a memory means wherein the initial constant values and the control values are stored;

a reading means for providing the control values and the initial constant values in response to the control sequence; and a writing means for inputting to and storing at the memory means the control values in response to the control sequence.

3. The controller of claim 2 wherein the control sequence includes:

write address signals which denote locations in the memory means where the initial constant values and the control values are stored;

write enable signals which go to an active state when either of the initial constant values or the control values is stored at the memory means; and read address signals which denote locations in the memory means from which the initial constant values and the control values are provided.

4. The controller of claim 3, wherein the calculation means contains:

an adding means for providing the addition result by adding the first and the second input values;

means for providing the subtraction result by subtracting the second input value from the first input value, the subtraction result consisting of a sign and an absolute value;

means for providing the multiplication result after a predetermined amount of first delay from the time the first and the second input values are inputted thereto, by multiplying the first and the second input values; and a dividing means for providing the division result after a predetermined amount of second delay from the time the first and the second input values are inputted thereto, by dividing the first input value by the second input value.

5. The controller of claim 4 wherein the control sequence further includes:

a first and a second input selection signals in response to which the first and the second input means select the first and the second input values, respectively;

a first and a second register enable signals, in response to which the first and the second registers store the first and the second input values, respectively;

an addition control signal notifying whether the adding means further increments one to the addition results;

a division start signal in response to which the dividing means starts the division;

a division end signal representing when the division is completed at the dividing means;

an operation selection signal in response to which the selection means selects one of the calculation results, wherein, in case that the comparison result is selected therein, the selection means selects either the first or the second input value in response to the operation selection signal and the sign of the subtraction result; and a selection signal in response to which the output means provides the selected calculation result or the first input value either to the second input means as one of the second set of input values or to the memory and input/output unit.

6. The controller of claim 2 wherein said processing means further provides temporary values which are obtained in the course of calculating the second group of predetermined equations;

the temporary values are further stored at the memory means;

said reading means further provides the temporary values to the arithmetic processing means unit in response to the control sequence; and said writing means further inputs to and stores at the memory means the temporary values in response to the control sequence.

7. The controller of claim 6 wherein the control sequence includes:

write address signals which denote locations in the memory means where the initial constant values, the control values and the temporary values are stored;

write enable signals which go to an active state when one of the initial constant values, the control values or the temporary values is stored at the memory means; and read address signals which denote locations in the memory means from which the initial constant values, the control values, and the temporary values are provided.

8. The controller of claim 1 wherein the calculation means contains:

means for providing the addition result by adding the first and the second input values;

means for providing the subtraction result by subtracting the second input value from the first input value, the subtraction result consisting of a sign and an absolute value;

means for providing the multiplication result after a predetermined amount of first delay from the time the first and the input values are inputted thereto, by multiplying the first and the second input values; and means for providing the division result after a predetermined amount of second delay from the time the first and the second input values are inputted thereto, by dividing the first input value by the second input value.

9. A controller, for use in a video signal encoding system, for deciding an inter/intra mode, a field/frame DCT mode and a quantization parameter, wherein the video signal contains a multiplicity of GOP's, each of the GOP's being classified into three types of frames, each of the frames being divided into a multiplicity of macroblocks, each macroblocks consisting of a plurality of blocks, each block including a half-block having odd-numbered lines and a half-block having even-numbered lines, and the encoding system encodes the video signal on a macroblock basis, said controller comprising:

means for generating a control sequence which includes a plurality of control signals in response to a signal denoting a start of and a type of a frame currently encoded;

a calculation unit for providing a first set of values by calculating a first group of predetermined equations;

processing means for providing a set of control values for each of the macroblocks in the frame in response to the control sequence and the first set of values, the set of control values denoting the inter/intra mode, the field/frame DCT mode and the quantization parameter, by calculating a second group of predetermined equations based on the sequential number of a macroblock currently encoded and predetermined initial constant values; and a memory and input/output unit for storing the initial constant values, providing the initial constant values to the processing means, storing the set of control values determined at the processing means and providing the control values to be used in encoding the video signal, wherein pixel values included in a processing macroblock are represented as O(i,j)'s, i and j being indices denoting a position of a pixel in the processing macroblock and ranging from 0 to (M1-1) and (M2-1), respectively, M1 and M2 being integers denoting the number of pixels included in a line of a macroblock and the number of lines included in a macroblock, respectively; and the first set of values includes a first value which is a sum of squares of pixel values included in each half-block of the video signal, a second value which is a sum of squares of pixel values included in each block of differential data which is a difference between the video signal and a predicted video signal obtained by using a motion compensation technique, a third value which is a sum of pixel values included in each half-block of the video signal, a fourth value which is defined as $$\sum_{i=0}^{M1-1}\sum_{j=0}^{M2-3} [O(i,j) - O(i,j+1)]^2$$

and a fifth value which is defined as $$\sum_{i=0}^{M1-1}\sum_{j=0}^{M2-3} [O(i,j) - O(i,j+2)]^2.$$

10. The controller of claim 9, wherein the calculation unit includes first calculation means which contains:

squaring means for squaring each pixel values included in a processing block, to thereby provide squared pixel values;

an adder for adding two squared pixel values, to thereby sequentially provide sums of two squared pixel values; and means for accumulating the sums of two squared pixel values, to thereby provide the first value for each of two half-blocks included in the processing block.

11. The controller of claim 10, wherein the accumulating means has:

an accumulator for adding a sum of two squared pixel values with a feedback value, to thereby provide a partial sum or the first value;

two memory means for storing the partial sum;

means for providing the partial sum to either of the two memory means in response to a first control signal;

means for selecting either of contents of the two memory means in response to a second control signal and providing it as the feedback value;

means for storing the output of the accumulator and providing the first values stored therein to the processing means in response to a third control signal; and means for generating the first, the second and the third control signals.

12. The controller of claim 11, wherein the calculation unit further includes second calculation means which contains:

squaring means for squaring each pixel value included in a processing block of the differential data, to thereby provide squared pixel values;

means for adding two squared pixel values provided from the squaring means, to thereby sequentially provide sums of two squared pixel values;

an accumulator for adding a sum of two squared pixel values with a feedback value, to thereby provide a partial sum or the second value;

memory means for storing the partial sum and providing the stored partial sum as the feedback value;

means for storing the output of the accumulator and providing the second value stored therein to the processing means in response to a control signal; and means for generating the control signal.

13. The controller of claim 9, wherein the calculation unit further includes third calculation means which contains:

means for adding two pixel values included in a processing block, to thereby sequentially provide sums of two pixel values; and means for accumulating the sums of two pixel values, to thereby provide the third value for each of two half-blocks included in the processing block.

14. The controller of claim 13, wherein the accumulating means has:

an accumulator for adding a sum of two pixel values with a feedback value, to thereby provide a partial sum or the third value;

two memory means for storing the partial sum;

means for providing the partial sum to either of the two memory means in response to a first control signal;

means for selecting either of contents of the two memory means in response to a second control signal and providing it as the feedback value;

means for storing the output of the accumulator and providing the third value stored therein to the processing means in response to a third control signal; and means for generating the first, the second and the third control signals.

15. The controller of claim 9, wherein the calculation unit further includes fourth calculation means which contains:

means for delaying pixel values included in each block contained in a processing macroblock, to thereby provide delayed pixel values;

storage means for storing the delayed pixel values in response to a first control signal;

selection means for selecting either the stored and delayed pixel values, or the delayed pixel values in response to a second control signal, to thereby provide selected pixel values;

means for providing the first and the second control signals;

subtraction means for subtracting each of the pixel values from each of the selected pixel values, to thereby provide difference values; and accumulating means for squaring each of the difference values and summing the squared difference values, to thereby provide the fourth value.

16. The controller of claim 15, wherein the accumulating means has:

squaring means for squaring each of the difference values, to thereby provide squared difference values;

an adder for adding two squared difference values, to thereby sequentially provide sums of two squared difference values;

an accumulator for adding a sum of two squared difference values with a feedback value, to thereby provide a partial sum or the fourth value;

memory means for storing the partial sum and providing the stored partial sum as the feedback value;

means for storing the output of the accumulator and providing the fourth value stored therein to the processing means in response to a third control signal; and means for generating the third control signal.

17. The controller of claim 16, wherein the delaying means delays the pixel values by a line of pixels included in a block and the storage means has M1 memory spaces.

18. The controller of claim 9, wherein the calculation unit further includes fifth calculation means which contains:

means for delaying pixel values included in each block contained in a processing macroblock by two lines of pixels included in the block, to thereby provide delayed pixel values;

storage means for storing the delayed pixel values in response to a first control signal, the storage means having 2×M1 memory spaces;

selection means for selecting either the stored and delayed pixel values, or the delayed pixel values in response to a second control signal, to thereby provide selected pixel values;

means for providing the first and the second control signals;

subtraction means for subtracting each of the pixel values from each of the selected pixel values, to thereby provide difference values; and accumulating means for squaring each of the difference values and summimg the squared difference values, to thereby provide the value.

19. An arithmetic unit, for use in a video signal encoding system, for deciding an inter/intra mode, a field/frame DCT mode and a quantization parameter in respond to a sequence of control signals, wherein the video signal contains a multiplicity of GOP's, each of the GOP's being classified into three types of frames, each of the frames being divided into a multiplicity of macroblocks, each macroblock consisting of a plurality of blocks, each block including a half-block having odd-numbered lines and a half-block having even-numbered lines, and pixel values included in each macroblock being represented as $O(i,j)$'s, i and j being integers denoting a position of a pixel in the macroblock and ranging from 0 to (M1-1) and (M2-1), respectively, M1 and M2 being integers denoting the number of pixels included in a line of the macroblock and the number of lines included in the macroblock, respectively, and the encoding system encodes the video signal on a macroblock basis, said arithmetic unit comprising:

a calculation unit for providing a first set of values by calculating a first group of predetermined equations, wherein the first set of values includes a first value which is a sum of squares of pixel values included in each half-block of the video signal, a second value which is a sum of squares of pixel values included in each block of differential data which is a difference between the video signal and a predicted video signal obtained by using a motion compensation technique, a third value which is a sum of pixel values included in each half-block of the video signal, a fourth value which is defined as:

$$\sum_{i=0}^{M1-1} \sum_{j=0}^{M2-3} [O(i,j) - O(i,j+1)]^2$$

and a fifth value which is defined as:

$$\sum_{i=0}^{M1-1} \sum_{j=0}^{M2-3} [O(i,j) - O(i,j+2)]^2; \text{ and}$$

processing means for generating a set of control values for each of the macroblocks in the frame in response to the control sequence and the first set of values, the set of control values denoting the inter/intra mode, the field/frame DCT mode and the quantization parameter, by calculating a second group of predetermined equations based on the sequential number of a macroblock currently encoded and predetermined initial constant values.

20. The arithmetic unit of claim 19 wherein the processing means includes:

a first input means for selecting a first input value among a first set of input values;

a second input means for selecting a second input value among a second set of input values, the second set containing the first input value selected at the first input means;

a first and a second registers for storing the first and the second input values, respectively;

a calculation means for performing an addition, a subtraction, a multiplication, a division and a comparison of the first and the second input values, to thereby provide a set of calculation results consisting of an addition result, a multiplication result, a subtraction result, a division result and a comparison result;

a selection means for selecting one of the calculation results; and an output means for providing the selected calculation result or the first input value either to the second input means as one of the second set of input values or to the memory and input/output unit.

* * * * *